US008201360B2

(12) United States Patent
Weder et al.

(10) Patent No.: US 8,201,360 B2
(45) Date of Patent: Jun. 19, 2012

(54) METHOD OF COVERING A POTTED PLANT OR FLORAL GROUPING WITH A FLORAL SLEEVE

(75) Inventors: Donald E. Weder, Highland, IL (US); Joseph G. Straeter, Highland, IL (US); Paul Fantz, Imperial, MO (US)

(73) Assignee: Wanda M. Weder & William F. Staeter, Highland, IL (US), not individually but soley as Trustees of The Family Trust, U/T/A dated Dec. 8, 1995

( * ) Notice: Subject to any disclaimer, the term of this patent is extended or adjusted under 35 U.S.C. 154(b) by 0 days.

(21) Appl. No.: 13/329,809

(22) Filed: Dec. 19, 2011

(65) Prior Publication Data

US 2012/0090233 A1 Apr. 19, 2012

Related U.S. Application Data

(63) Continuation of application No. 13/017,409, filed on Jan. 31, 2011, now abandoned, which is a continuation of application No. 12/822,817, filed on Jun. 24, 2010, now abandoned, which is a continuation of application No. 12/288,233, filed on Oct. 17, 2008, now abandoned, which is a continuation of application No. 11/928,998, filed on Oct. 30, 2007, now abandoned, which is a continuation of application No. 11/203,483, filed on Aug. 12, 2005, now abandoned, which is a continuation of application No. 10/676,475, filed on Oct. 1, 2003, now abandoned, which is a continuation of application No. 10/303,373, filed on Nov. 22, 2002, now Pat. No. 6,655,086, which is a continuation of application No. 10/190,278, filed on Jul. 3, 2002, now Pat. No. 6,523,305, which is a continuation of application No. 10/004,991, filed on Dec. 4, 2001, now Pat. No. 6,477,804, which is a continuation of application No. 09/747,227, filed on Dec. 22, 2000, now Pat. No. 6,341,446, which is a continuation of application No. 09/080,771, filed on May 18, 1998, now Pat. No. 6,182,395, which is a continuation of application No. 08/606,957, filed on Feb. 26, 1996, now abandoned, said application No. 11/203,483 is a continuation-in-part of application No. 11/110,250, filed on Apr. 20, 2005, now abandoned, which is a continuation of application No. 10/780,084, filed on Feb. 17, 2004, now abandoned, which is a continuation of application No. 10/325,103, filed on Dec. 19, 2002, now Pat. No. 6,691,458, which is a continuation of application No. 10/051,116, filed on Jan. 17, 2002, now Pat. No. 6,701,667, which is a continuation of application No. 09/895,302, filed on Jun. 29, 2001, now Pat. No. 6,343,456, which is a continuation of application No. 09/626,375, filed on Jul. 26, 2000, now abandoned, which is a continuation of application No. 09/366,630, filed on Aug. 3, 1999, now Pat. No. 6,192,657, which is a continuation of application No. 09/025,090, filed on Feb. 17, 1998, now Pat. No. 5,930,979, which is a continuation of application No. 08/775,516, filed on Jan. 2, 1997, now Pat. No. 5,740,658, which is a continuation of application No. 08/460,180, filed on Jun. 2, 1995, now Pat. No. 5,617,703, which is a continuation of application No. 08/237,078, filed on May 3, 1994, now Pat. No. 5,625,979, which is a continuation-in-part of application No. 08/220,852, filed on Mar. 31, 1994, now Pat. No. 5,572,851.

(51) Int. Cl.
*A01G 9/02* (2006.01)

(52) U.S. Cl. .......................................................... 47/72

(58) Field of Classification Search ....... 47/72; 206/423
See application file for complete search history.

(56) References Cited

U.S. PATENT DOCUMENTS

| | | | |
|---|---|---|---|
| 491,786 | A | 2/1893 | Schurig |
| 524,219 | A | 8/1894 | Schmidt |
| 732,889 | A | 7/1903 | Paver |
| 950,785 | A | 3/1910 | Pene |
| 1,044,260 | A | 11/1912 | Schloss |

| | | | | | |
|---|---|---|---|---|---|
| 1,063,154 | A | | 5/1913 | Bergen | |
| 1,446,563 | A | | 2/1923 | Hughes | |
| 1,520,647 | A | | 12/1924 | Hennigan | |
| 1,525,015 | A | | 2/1925 | Weeks | |
| 1,610,652 | A | | 12/1926 | Bouchard | |
| 1,697,751 | A | | 1/1929 | Blake | |
| 1,794,212 | A | | 1/1929 | Snyder | |
| 1,811,574 | A | | 3/1930 | Barrett | |
| 1,863,216 | A | | 6/1932 | Wordingham | |
| 1,978,631 | A | | 10/1934 | Herrlinger | |
| 2,048,123 | A | | 7/1936 | Howard | |
| RE21,065 | E | | 5/1939 | Copeman | |
| 2,170,147 | A | | 8/1939 | Lane | |
| 2,200,111 | A | | 5/1940 | Bensel | |
| 2,278,673 | A | | 4/1942 | Savada et al. | |
| 2,302,259 | A | | 11/1942 | Rothfuss | |
| 2,323,287 | A | | 7/1943 | Amberg | |
| 2,355,559 | A | | 8/1944 | Renner | |
| 2,371,985 | A | | 3/1945 | Freiberg | |
| 2,411,328 | A | | 11/1946 | MacNab | |
| 2,510,120 | A | | 6/1950 | Leander | |
| 2,529,060 | A | | 11/1950 | Trillich | |
| 2,621,142 | A | | 12/1952 | Wetherell | |
| 2,648,487 | A | | 8/1953 | Linda | |
| 2,688,354 | A | | 9/1954 | Berger | |
| 2,688,914 | A | | 9/1954 | Eckler | |
| 2,774,187 | A | | 12/1956 | Smithers | |
| 2,822,287 | A | | 2/1958 | Avery | |
| 2,846,060 | A | | 8/1958 | Yount | |
| 2,850,842 | A | | 9/1958 | Eubank, Jr. | |
| 2,883,262 | A | | 4/1959 | Borin | |
| 2,989,828 | A | | 6/1961 | Warp | |
| 3,003,681 | A | | 10/1961 | Orsini | |
| 3,022,605 | A | | 2/1962 | Reynolds | |
| 3,080,680 | A | | 3/1963 | Reynolds et al. | |
| 3,094,810 | A | | 6/1963 | Kalpin | |
| 3,293,100 | A | | 8/1963 | Questel | |
| 3,121,647 | A | | 2/1964 | Harris et al. | |
| 3,130,113 | A | | 4/1964 | Silman | |
| 3,172,796 | A | | 3/1965 | Gülker | |
| 3,271,922 | A | | 9/1966 | Wallerstein et al. | |
| 3,316,675 | A | | 5/1967 | Cartwright, Jr. | |
| 3,322,325 | A | | 5/1967 | Bush | |
| 3,357,152 | A | | 12/1967 | Geigel | |
| 3,375,607 | A | | 4/1968 | Melvoid | |
| 3,376,666 | A | | 4/1968 | Leonard | |
| 3,380,646 | A | | 4/1968 | Doyen et al. | |
| 3,405,863 | A | | 10/1968 | Kugler | |
| 3,431,706 | A | | 3/1969 | Stuck | |
| 3,508,372 | A | | 4/1970 | Wallerstein et al. | |
| 3,510,054 | A | | 5/1970 | Sanni et al. | |
| 3,512,700 | A | | 5/1970 | Evans et al. | |
| 3,550,318 | A | | 12/1970 | Remke et al. | |
| 3,552,059 | A | | 1/1971 | Moore | |
| 3,554,434 | A | | 1/1971 | Anderson | |
| 3,556,389 | A | | 1/1971 | Gregoire | |
| 3,557,516 | A | | 1/1971 | Brandt | |
| 3,613,309 | A | | 10/1971 | Coburn | |
| 3,620,366 | A | | 11/1971 | Parkinson | |
| 3,681,105 | A | | 8/1972 | Milutin et al. | |
| 3,739,522 | A | | 6/1973 | Greenbaum | |
| 3,767,104 | A | | 10/1973 | Bachman et al. | |
| 3,793,799 | A | | 2/1974 | Howe et al. | |
| 3,804,322 | A | | 4/1974 | Ericson | |
| 3,869,828 | A | | 3/1975 | Matsumoto | |
| 3,872,621 | A | | 3/1975 | Greenbaum | |
| 3,888,042 | A | | 6/1975 | Bourne | |
| 3,888,443 | A | | 6/1975 | Flanigen | |
| 3,962,503 | A | | 6/1976 | Crawford | |
| 4,043,077 | A | | 8/1977 | Stonehocker | |
| 4,054,697 | A | | 10/1977 | Reed et al. | |
| 4,091,925 | A | * | 5/1978 | Griffo et al. .................. | 206/423 |
| 4,113,100 | A | | 9/1978 | Soja et al. | |
| 4,118,890 | A | | 10/1978 | Shore | |
| 4,149,339 | A | | 4/1979 | Hall et al. | |
| 4,170,618 | A | | 10/1979 | Adams | |
| 4,189,868 | A | | 2/1980 | Tymchuck et al. | |
| 4,216,620 | A | | 8/1980 | Weder et al. | |
| 4,248,347 | A | | 2/1981 | Trimbee | |
| 4,258,501 | A | | 3/1981 | Brown | |
| D259,333 | S | | 5/1981 | Charbonneau | |
| 4,265,049 | A | | 5/1981 | Gorewitz | |
| 4,280,314 | A | | 7/1981 | Stuck | |
| 4,297,811 | A | | 11/1981 | Weder | |
| 4,299,056 | A | | 11/1981 | Towning | |
| 4,333,267 | A | | 6/1982 | Witte | |
| 4,347,686 | A | | 9/1982 | Wood | |
| 4,380,564 | A | | 4/1983 | Cancio et al. | |
| 4,400,910 | A | | 8/1983 | Koudstall et al. | |
| 4,413,725 | A | | 11/1983 | Bruno et al. | |
| 4,508,223 | A | | 4/1985 | Catrambone | |
| D279,279 | S | | 6/1985 | Wagner | |
| 4,546,875 | A | | 10/1985 | Zweber | |
| 4,570,423 | A | | 2/1986 | DeLong | |
| 4,621,733 | A | | 11/1986 | Harris | |
| 4,640,079 | A | | 2/1987 | Stuck | |
| 4,674,972 | A | | 6/1987 | Wagner | |
| 4,692,111 | A | | 9/1987 | Wagner | |
| 4,717,262 | A | | 1/1988 | Roen et al. | |
| 4,733,521 | A | | 3/1988 | Weder et al. | |
| 4,765,464 | A | | 8/1988 | Ristvedt | |
| 4,771,573 | A | | 9/1988 | Stengel | |
| 4,773,182 | A | | 9/1988 | Weder et al. | |
| 4,801,014 | A | | 1/1989 | Meadows | |
| 4,810,109 | A | | 3/1989 | Castel | |
| 4,835,834 | A | | 6/1989 | Weder | |
| D301,991 | S | | 7/1989 | Van Sant | |
| D304,317 | S | | 10/1989 | Wagner | |
| 4,900,390 | A | | 2/1990 | Colten et al. | |
| 4,918,861 | A | | 4/1990 | Carpenter | |
| 4,941,572 | A | | 7/1990 | Harris | |
| 4,946,290 | A | | 8/1990 | Matyja | |
| 4,980,209 | A | | 12/1990 | Hill | |
| 4,989,396 | A | | 2/1991 | Weder et al. | |
| D315,700 | S | | 3/1991 | Stephens | |
| 5,073,161 | A | | 12/1991 | Weder et al. | |
| 5,074,675 | A | | 12/1991 | Osgood | |
| 5,076,011 | A | | 12/1991 | Stehouwer | |
| 5,105,599 | A | | 4/1992 | Weder | |
| 5,111,638 | A | | 5/1992 | Weder | |
| 5,117,584 | A | | 6/1992 | Ottenwalder | |
| 5,120,382 | A | | 6/1992 | Weder | |
| 5,152,100 | A | | 10/1992 | Weder et al. | |
| 5,181,364 | A | | 1/1993 | Weder | |
| D335,105 | S | | 4/1993 | Ottenwalder et al. | |
| 5,199,242 | A | | 4/1993 | Weder et al. | |
| 5,205,108 | A | | 4/1993 | Weder et al. | |
| 5,228,234 | A | | 7/1993 | de Klerk et al. | |
| 5,235,782 | A | | 8/1993 | Landau | |
| 5,239,775 | A | | 8/1993 | Landau | |
| 5,241,783 | A | | 9/1993 | Krueger | |
| 5,249,407 | A | | 10/1993 | Stuck | |
| 5,259,106 | A | | 11/1993 | Weder et al. | |
| 5,307,606 | A | | 5/1994 | Weder | |
| 5,315,785 | A | | 5/1994 | Avôt et al. | |
| 5,350,240 | A | | 9/1994 | Billman et al. | |
| 5,353,575 | A | | 10/1994 | Stepanek | |
| 5,361,482 | A | | 11/1994 | Weder et al. | |
| 5,363,592 | A | * | 11/1994 | Weder et al. ................... | 47/66.7 |
| 5,388,695 | A | | 2/1995 | Gilbert | |
| 5,428,939 | A | | 7/1995 | Weder et al. | |
| 5,443,670 | A | | 8/1995 | Landau | |
| D362,829 | S | | 10/1995 | Wagner | |
| 5,493,809 | A | | 2/1996 | Weder et al. | |
| D368,025 | S | | 3/1996 | Sekerak et al. | |
| 5,496,251 | A | | 3/1996 | Cheng | |
| 5,496,252 | A | | 3/1996 | Gilbert | |
| 5,526,932 | A | | 6/1996 | Weder | |
| 5,551,570 | A | | 9/1996 | Shaffer et al. | |
| 5,572,849 | A | | 11/1996 | Weder et al. | |
| 5,572,851 | A | | 11/1996 | Weder | |
| 5,575,107 | A | | 11/1996 | Doerr | |
| 5,575,133 | A | | 11/1996 | Weder et al. | |
| 5,617,703 | A | | 4/1997 | Weder | |
| 5,624,320 | A | | 4/1997 | Martinez | |
| 5,625,979 | A | | 5/1997 | Weder | |
| 5,647,168 | A | | 7/1997 | Gilbert | |
| 5,647,193 | A | | 7/1997 | Weder et al. | |

| | | | |
|---|---|---|---|
| 5,683,770 | A | 11/1997 | Weder |
| 5,706,604 | A | 1/1998 | Yogi |
| 5,706,605 | A | 1/1998 | Alzacar |
| 5,715,944 | A | 2/1998 | Windisch |
| 5,735,103 | A | 4/1998 | Weder |
| 5,758,472 | A | 6/1998 | Weder |
| 5,765,306 | A | 6/1998 | Weder et al. |
| 5,813,194 | A | 9/1998 | Weder |
| D399,787 | S | 10/1998 | Wagner |
| D399,788 | S | 10/1998 | Wagner |
| D404,684 | S | 1/1999 | Shea |
| D409,057 | S | 5/1999 | Wagner |
| 5,924,241 | A | 7/1999 | Hodge |
| 5,941,020 | A | 8/1999 | Weder |
| D413,547 | S | 9/1999 | Wagner |
| 5,966,866 | A | 10/1999 | Ferguson |
| 5,974,730 | A | 11/1999 | Chien |
| D419,436 | S | 1/2000 | Celtorius et al. |
| 6,009,687 | A | 1/2000 | Weder |
| 6,047,524 | A | 4/2000 | Weder |
| D424,972 | S | 5/2000 | Ferguson |
| 6,071,445 | A | 6/2000 | Wagner |
| D428,827 | S | 8/2000 | Wagner |
| 6,098,336 | A | 8/2000 | Ferguson |
| D431,495 | S | 10/2000 | Wagner |
| 6,129,208 | A | 10/2000 | Ferguson |
| 6,129,209 | A | 10/2000 | Tchira |
| 6,141,906 | A | 11/2000 | Weder |
| D435,481 | S | 12/2000 | Wagner |
| 6,182,395 | B1 | 2/2001 | Weder |
| 6,183,590 | B1 | 2/2001 | Weder |
| D448,130 | S | 9/2001 | Wagner |
| 6,286,255 | B1 | 9/2001 | Weder et al. |
| 6,286,256 | B1 | 9/2001 | Weder |
| 6,345,467 | B1 | 2/2002 | Weder |
| 6,385,905 | B1 | 5/2002 | Weder |
| 6,546,669 | B2 | 4/2003 | Weder et al. |
| 6,598,341 | B2 | 7/2003 | Weder |
| 2011/0120004 | A1 | 5/2011 | Weder et al. |

FOREIGN PATENT DOCUMENTS

| | | | |
|---|---|---|---|
| AU | 4231978 | | 6/1979 |
| BE | 654427 | | 1/1965 |
| CH | 560532 | | 4/1975 |
| DE | 15550 | | 6/1900 |
| DE | 345464 | | 12/1921 |
| DE | 513971 | | 11/1930 |
| DE | 1166692 | | 3/1964 |
| DE | 1962947 | | 6/1971 |
| DE | 2060812 | | 11/1971 |
| DE | 2748626 | | 5/1979 |
| DE | 3445799 | | 6/1986 |
| DE | 3829281 | | 5/1989 |
| DE | 3911847 | | 10/1990 |
| DK | 1204647 | | 9/1970 |
| EP | 0050990 | | 5/1982 |
| EP | 0791543 | | 8/1997 |
| FR | 1376047 | | 9/1964 |
| FR | 2036163 | | 12/1970 |
| FR | 2137325 | | 12/1972 |
| FR | 2272914 | | 12/1975 |
| FR | 2489126 | | 3/1982 |
| FR | 2567068 | | 7/1984 |
| FR | 2610604 | | 8/1988 |
| FR | 2603159 | | 3/1989 |
| FR | 2619698 | | 3/1989 |
| FR | 2651663 | | 3/1991 |
| GB | 5605 | | 0/1885 |
| GB | 2055031 | | 2/1981 |
| GB | 2056410 | | 3/1981 |
| GB | 2074542 | | 11/1981 |
| GB | 2094123 | | 9/1982 |
| GB | 2128083 | | 4/1984 |
| GB | 2203127 | | 10/1988 |
| GB | 2203127 | A * | 10/1988 |
| GB | 2212136 | | 7/1989 |
| GB | 2252708 | | 8/1992 |
| IT | 224507 | | 4/1996 |
| JP | 542958 | | 2/1993 |
| JP | 6127555 | | 5/1994 |
| JP | 8-19334 | | 1/1996 |
| NL | 9301709 | | 12/1984 |
| NL | 1000658 | | 1/1996 |
| WO | 9315979 | | 8/1993 |
| WO | 9712819 | | 4/1997 |

OTHER PUBLICATIONS

OTHER PUBLICATIONS

Speed Cover Brochure, “The Simple Solution for Those Peak Volume Periods”, Highland Supply Corporation, © 1989.
“Speed Sheets and Speed Rolls” Brochure, Highland Supply Corporation, © 1990.
“Color Them Happy with Highlander Products” © 1992.
“Costa Keeps the Christmas Spirit”, Supermarket Floral, Sep. 15, 1992.
“Super Seller”, Supermarket Floral, Sep. 15, 1992.
“Halloween”, Link Magazine, Sep. 1992.
“Now More Than Ever”, Supermarket Floral, Sep. 15, 1992.
Le Plant Sac Advertisement, published prior to Sep. 26, 1987.
“A World of Cut Flower and Pot Plant Packaging” Brochure, Klerk’s Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
“Stand Alone Plastic Bagmaking” brochure, AMI, Atlanta, GA, Feb. 15, 1996, 2 pages.
“Foil Jackets” brochure, Custom Medallion, Inc., Dec. 1996, 2 pages.
“Derwent Abstract” of FR 2610604A. It is noted that the abstract is an incorrect English translation of the contents of the French patent. The French patent does not enable or disclose adhesively attaching the covering to the container. 1988.
“Silver Linings” Brochure, Affinity Diversified Industries, Inc., 1986. The Silver Linings brochure shows a floral sleeve with a closed bottom. The brochure shows, in one embodiment, a vase with flowers inside a “cut flower” sleeve with the sleeve tied with a ribbon about the neck of the vase.
“Special Occasion Printed Highlophane Bags” Brochure, Highland Supply Corporation, 1990, 2 pages.
“Creative Packaging” Brochure, John Henry Company, Sep. 1992.
“Make Highlander Your Headquarters” Brochure, Highland Supply Corporation, 1991.

* cited by examiner

*Primary Examiner* — Frank T Palo
(74) *Attorney, Agent, or Firm* — Dunlap Codding, PC

(57) ABSTRACT

A method of covering a potted plant or a floral grouping with a floral sleeve. The sleeve has, in one embodiment, a plurality of randomly positioned overlapping folds disposed in a sidewall of the sleeve. The sleeve optionally has a detachable upper portion.

18 Claims, 16 Drawing Sheets

METHOD OF COVERING A POTTED PLANT OR FLORAL GROUPING WITH A FLORAL SLEEVE

CROSS-REFERENCE TO RELATED APPLICATIONS

This application is a continuation of U.S. Ser. No. 13/017,409, filed Jan. 31, 2011, now abandoned; which is a continuation of U.S. Ser. No. 12/822,817, filed Jun. 24, 2010, now abandoned; which is a continuation of U.S. Ser. No. 12/288,233, filed Oct. 17, 2008, now abandoned; which is a continuation of U.S. Ser. No. 11/928,998, filed Oct. 30, 2007, now abandoned; which is a continuation of U.S. Ser. No. 11/203,483, filed Aug. 12, 2005, now abandoned; which is a continuation of U.S. Ser. No. 10/676,475, filed Oct. 1, 2003, now abandoned; which is a continuation of U.S. Ser. No. 10/303,373, filed Nov. 22, 2002, now U.S. Pat. No. 6,655,086; which is a continuation of U.S. Ser. No. 10/190,278, filed Jul. 3, 2002, now U.S. Pat. No. 6,523,305; which is a continuation of U.S. Ser. No. 10/004,991, filed Dec. 4, 2001, now U.S. Pat. No. 6,477,804; which is a continuation of U.S. Ser. No. 09/747,227, filed Dec. 22, 2000, now U.S. Pat. No. 6,341,446; which is a continuation of U.S. Ser. No. 09/080,771, filed May 18, 1998, now U.S. Pat. No. 6,182,395; which is a continuation of U.S. Ser. No. 08/606,957, filed Feb. 26, 1996, now abandoned.

U.S. Ser. No. 11/203,483 is also a continuation-in-part of U.S. Ser. No. 11/110,250, filed Apr. 20, 2005, now abandoned; which is a continuation of U.S. Ser. No. 10/780,084, filed Feb. 17, 2004, now abandoned; which is a continuation of U.S. Ser. No. 10/325,103, filed Dec. 19, 2002, now U.S. Pat. No. 6,691,458, issued Feb. 17, 2004; which is a continuation of U.S. Ser. No. 10/051,116, filed Jan. 17, 2002, now U.S. Pat. No. 6,701,667, issued Mar. 9, 2004; which is a continuation of Ser. No. 09/895,302, filed Jun. 29, 2001, now U.S. Pat. No. 6,343,456; which is a continuation of U.S. Ser. No. 09/626,375, filed Jul. 26, 2000, now abandoned; which is a continuation of U.S. Ser. No. 09/366,630, filed Aug. 3, 1999, now U.S. Pat. No. 6,192,657; which is a continuation of U.S. Ser. No. 09/025,090, filed Feb. 17, 1998, now U.S. Pat. No. 5,930,979; which is a continuation of U.S. Ser. No. 08/775,516, filed Jan. 2, 1997, now U.S. Pat. No. 5,740,658; which is a continuation of U.S. Ser. No. 08/460,180, filed Jun. 2, 1995, now U.S. Pat. No. 5,617,703; which is a continuation of U.S. Ser. No. 08/237,078, filed May 3, 1994, now U.S. Pat. No. 5,625,979, issued on May 6, 1997; which is a continuation-in-part of U.S. Ser. No. 08/220,852, filed Mar. 31, 1994, now U.S. Pat. No. 5,572,851. The entire contents of each of the above-referenced patents and patent applications are hereby expressly incorporated by reference herein.

FIELD OF THE PRESENTLY DISCLOSED AND CLAIMED INVENTIVE CONCEPT(S)

This presently disclosed and claimed inventive concept(s) generally relates to sleeves to be used as containers and, more particularly, sleeves used to wrap flower pots containing floral groupings and/or media containing floral groupings, and methods of using same.

BACKGROUND OF THE PRESENTLY DISCLOSED AND CLAIMED INVENTIVE CONCEPT(S)

It is well known in the floral packaging industry to apply floral sleeves about potted plants for the purpose of erecting a protective sheath about the blooms and foliage of the potted plant for preventing damage to them and entanglement with adjacent plants. Such sleeves generally have an open bottom through which the inserted pot is exposed. U.S. Pat. No. 4,333,267 issued to Witte and U.S. Pat. No. 4,413,725 issued to Bruno, and Australian Patent 42319/78 show examples of such open-bottom sleeves.

Other sleeves have closed bottoms upon which the bottom of the pot can rest. However, in such closed sleeves, the lower portion does not have a shape which conforms to the shape of the bottom and outer sides of the pot. For example, in U.S. Pat. No. 5,235,782 issued to Landau, an unattractive void space is formed about the pot when the pot is inserted into the sleeve. In U.S. Pat. No. 5,388,695, issued to Gilbert, when a pot is inserted into the sleeve, the outer sides of the pot fit within the taper of the sleeve but an empty void space is left underneath the pot which must then be tucked below the bottom of the pot to conceal it. The basic problem in applying a closed-bottom flat sleeve to a pot is that in going from a two-dimensional flat sleeve to a three-dimensional open sleeve, the shape of the opened sleeve does not conform to the shape of the pot.

There are no sleeves currently available which can be erected so that the sleeve closely conforms to the curvature of both the outer sidewall of the pot and to the bottom surface of the pot, whereby the lower portion of the sleeve forms an attractive decorative cover about the pot reminiscent of a preformed pot cover when the upper portion of the sleeve is detached. The object of the presently disclosed and claimed inventive concept(s) is, therefore, to provide a flat, two-dimensional sleeve which is erectable into a three-dimensional wherein the erected sleeve has a shape which conforms to the shape of the pot without revealing unsightly extra material.

DESCRIPTION OF THE PREFERRED EMBODIMENTS

Figure 1:
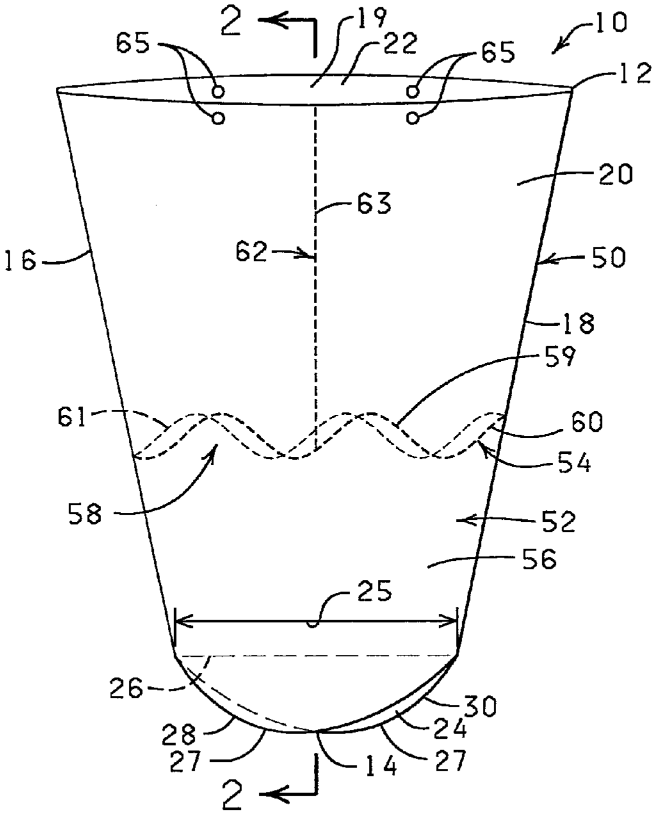
FIG. 1 is a perspective view of a flattened gusseted sleeve constructed in accordance with the presently disclosed and claimed inventive concept(s).

The presently disclosed and claimed inventive concept(s) contemplates in a preferred embodiment a plant packaging system comprising a floral sleeve (also referred to herein as a "sleeve") further comprising a combination of a protective upper sleeve portion (also referred to herein as an "upper portion") and a decorative lower cover portion (also referred to herein as a "lower portion") for packaging a potted plant. The protective upper sleeve portion can be detached from the decorative lower cover portion of the floral sleeve once the protective function of the sleeve has been completed, thereby leaving the decorative lower cover portion in a position covering the pot. The protective upper sleeve portion and decorative lower cover portion may be of unitary construction or may be separate components which are attached together by various bonding materials or other sealing or attaching methods.

More specifically, in a preferred embodiment, the presently disclosed and claimed inventive concept(s) contemplates a sleeve-type plant cover for covering a pot having a bottom surface and an outer peripheral surface. The plant cover comprises (1) a lower portion having a lower end, an upper end, an outer peripheral surface, and an expansion element for allowing expansion of a portion of the lower portion, and (2) an upper portion extending from the upper end of the lower portion and detachable therefrom. As used herein, the term "expansion element" means an amount of material or alternately, a type of material which can be expanded or unfolded to cover a greater area than in the unexpanded state. The expansion element may be an infolded or outfolded gusset, a pleated or folded area, overlapping folds, or elastic material. When the pot is inserted into the lower portion, the expansion element expands to allow the pot to fit into the lower portion of the sleeve. The lower portion is sized to substantially cover and conform to the outer peripheral and bottom surfaces of the pot once the lower portion has been expanded about the pot.

In a preferred embodiment, the sleeve is constructed so that when the pot is disposed within the sleeve, the sleeve conforms to the shape of the pot so that the bottom of the pot is coplanar with the inner bottom surface of the sleeve, wherein there are substantially no overlapping folded portions in that portion of the sleeve which is underneath the pot. Further, it is also preferred that a sidewall of the sleeve in the erected position extends angularly from the bottom of the sleeve upwardly from the bottom. Preferably the sidewall of the expanded sleeve extends upwardly from the bottom of the sleeve at a substantially uniform angle so that there are no outwardly extending "ears" such as those seen in U.S. Pat. No. 5,235,782, described above. More preferably, the sidewall of the sleeve in the expanded condition extends upwardly from the bottom at substantially the same angle at which the sidewall of the pot extends from the bottom of the pot. Preferably, the bottom of the sleeve in the expanded condition conforms to the curvature of the circumference of the bottom of the pot disposed therein. Also, preferably, the sidewall of the sleeve in the expanded condition conforms to the curvature of the circumference of the outer peripheral surface of the pot or to the circumference taken through a plane thereof.

In a preferred embodiment, the sleeve is constructed such that when the sleeve is converted to the expanded position and a pot is disposed therein, both the bottom and the sidewall of the sleeve fit closely against the bottom and sidewall of the pot leaving substantially no void space or gaps there between. In an alternative preferred embodiment, if a gap does exist between the sidewall of the sleeve and the sidewall of the pot, the gap is substantially uniform for the entire length of the sidewall of the sleeve from the bottom of the sleeve to the upper end of the pot in any given plane.

In a particularly preferred embodiment, the presently disclosed and claimed inventive concept(s) comprises a flattened sleeve for containing a pot having an outer peripheral surface and a bottom surface. The sleeve comprises a first panel having an upper end, a lower end, a first side and a second side; a second panel having an upper end, a lower end, a first side and a second side; and a gusset portion. In this embodiment of the flattened sleeve, the first panel is disposed flatwise upon the second panel with the first side of the first panel joined with the first side of the second panel, and with the second side of the first panel joined with the second side of the second panel, and with the gusset portion extending from the lower end of the first panel and from the lower end of the second panel. The gusset is inwardly folded to extend a distance between the first panel and the second panel.

In this embodiment, the flattened sleeve has a convexly curved lower end, and when the sleeve is expanded to an open state and disposed about the pot, the sleeve has a sidewall which substantially surrounds the outer peripheral surface of the pot and a bottom substantially without an overlapped portion therein when the pot rests upon the bottom of the sleeve. Preferably, the bottom of the sleeve in the open state substantially conforms to the circumferential curvature of the bottom surface of the pot. Also preferably, the sidewall of the sleeve in the open state substantially conforms to the curvature of the outer peripheral surface of the pot. The sidewall of the sleeve in the open state may extend upwardly from the bottom of the sleeve at an angle greater than 90 degrees when a pot is disposed within the sleeve. Also, the sidewall of the sleeve in the open state may extend upwardly at a substantially uniform angle from the bottom of the sleeve along the outer peripheral surface of the pot disposed therein.

Preferably, the sleeve comprises an upper sleeve portion extending from the upper end of the first panel and from the upper end of the second panel and which is detachable therefrom via a detaching element or assembly. Additionally, the sleeve forms a decorative cover when disposed about the pot. Further, the gusset, in a preferred embodiment, has a straight fold extending from the first sides of the first and second panels to the second sides of the first and second panels. Alternatively, the gusset has a curved fold extending from the first sides of the first and second panels to the second sides of the first and second panels. Moreover, a bonding material may be disposed upon a portion of the sleeve for connecting to the pot. The presently disclosed and claimed inventive concept(s) may also comprise a package comprising a flower pot or other items described herein disposed within the sleeve described above, or any other sleeve described herein. The presently disclosed and claimed inventive concept(s) may also comprise a method of assembling a package comprising a flower pot or other items described elsewhere herein disposed within the sleeve described above, or any other sleeve described herein.

In another embodiment, the flattened sleeve is defined as above with a first panel, second panel and gusset and is for containing a pot having a bottom surface with a characteristic geometric shape. In this embodiment, the sleeve is not defined as having a convexly curved lower end but rather as having, in the open state, a bottom having a shape which conforms to the characteristic geometric shape of the bottom surface of the pot so that the bottom of the sleeve is left substantially without an overlapped portion therein when the pot rests upon the bottom of the sleeve. Where used herein, the term "substantially without an overlapped portion" in the bottom of the sleeve means that the bottom has no single fold the length of which exceeds one radius of the diameter of the bottom surface of the pot or a plurality of folds, the total lengths of which exceed one diameter of the bottom surface of the pot.

The upper portion, when present, may be detachable via a detaching element such as perforations, tear strips and zippers. The sleeve may have an extended portion extending from the upper portion for serving as a handle or support device. Further, an expansion element is optionally constructed and positioned in the sleeve for allowing expansion of a portion of the lower portion into a decorative skirt extending angularly from the lower portion when the upper portion of the sleeve is detached from the upper end of the lower portion. The expansion element may be infolded or outfolded gussets, a plurality of vertical pleats, a plurality of vertical folds each having a z-shaped cross section, a plurality of vertical accordion-type folds, or other similar types of expandable forms. The expansion element may comprise a plurality of randomly positioned, overlapping folds. Any of the folds described herein may be connected or unconnected. The expansion element may be an elastic material which expands to fit the outer surface and the bottom surface of the pot when the pot is inserted into the lower portion of the sleeve. These embodiments are all described in further detail below.

The lower portion of the sleeve may be constructed from a first material and the upper portion of the sleeve may be constructed from a second material different from the first material; or, a portion of the lower portion may be constructed from the same material as the upper sleeve portion; or, the expansion element may be constructed of one material and the remainder of the lower portion and/or upper portion of the sleeve constructed of another material.

The sleeve may form part of a plant package when used in conjunction with a pot disposed within the retaining space of the lower portion of the sleeve, the pot having a floral grouping disposed therein, and wherein the pot is substantially surrounded and encompassed by the lower portion of the sleeve and the floral grouping is substantially surrounded and encompassed by the upper portion of the sleeve.

Further, the lower portion may include a bonding material for bondingly connecting to the upper portion. Also, the lower portion may include a bonding material for bondingly connecting to a pot disposed therein. Further, the upper portion may include a bonding material for bondingly connecting to the lower portion. The sleeve may further comprise part of a plant package which includes a pot disposed within the inner retaining space of the lower portion, the pot having a floral grouping disposed therein, and wherein the pot is substantially surrounded and encompassed by the lower portion and the floral grouping is substantially surrounded and encompassed by the upper portion.

The lower portion of the sleeve may be constructed from a first material and from a second material different from the first material.

While the various sleeve embodiments disclosed herein are primarily directed to use with round bottom flower pots, it will also be clear to one of ordinary skill in the art that one may construct sleeves using the technology described herein which are adapted to fit about and enclose pots having configurations other than round, such as square, rectangular, triangular, trapezoidal, cylindrical, ovoid and other well-known geometric shapes, and which function in accordance with the presently disclosed and claimed inventive concept(s) to substantially conform to the shape of the pot. An example of such a sleeve is shown in FIGS. 20-23 in U.S. Pat. No. 5,493,809, the specification and drawings of which are hereby specifically incorporated herein by reference in their entirety. Where a pot has a shape other than a curved shape (i.e., such as a square), the sleeve conforms to the outer peripheral surface of the pot, or to the perimeter of a plane therethrough.

The sleeve described herein can also be used in various embodiments as a growing container or flower pot for growing and cultivating various botanical items. The sleeve described herein may also be used as a combination growing pot and decorative cover for a botanical item, wherein the botanical item is first cultivated in the sleeve, then displayed in the lower portion of the sleeve. The sleeve in its various embodiments described herein may also be used to contain various comestible items such as candy, treats, popcorn, french fries, chicken nuggets, and other fried items, and frozen confections. The sleeve may further be used to contain liquids for drinking or storage; the sleeve may be a collapsible cup, for example.

The Embodiments and Methods of Use of FIGS. 1-6C

Figure 2:
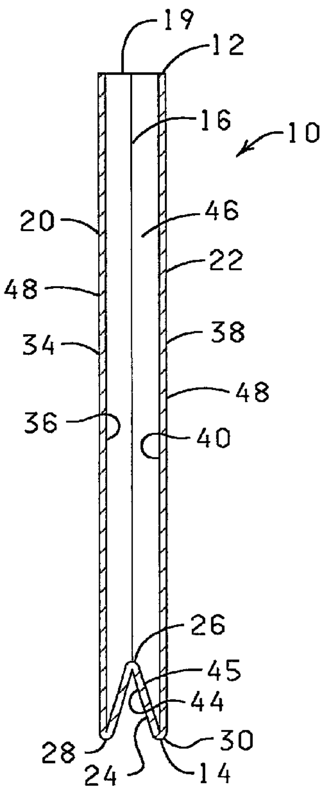
FIG. 2 is a cross-sectional view of the sleeve of FIG. 1 taken along line 2-2.

A preferred embodiment of the presently disclosed and claimed inventive concept(s), as shown in FIGS. 1 and 2 and designated therein by the general reference numeral 10, is a flexible tubular bag or sleeve. The sleeve 10 initially comprises a flexible, flat, collapsed piece of material which is openable in the form of a tube or sleeve. The sleeve 10 preferably is tapered outwardly from its lower end toward a larger diameter at its upper end. In its flattened state, the sleeve 10 generally has an overall trapezoidal or modified trapezoidal shape, and when opened is substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical or columnar form, as long as the sleeve 10 functions in accordance with the presently disclosed and claimed inventive concept(s) in the manner described herein.

The flattened sleeve 10 has an upper end 12, a lower end 14, a first side 16 and a second side 18. The sleeve 10 has an opening 19 at the upper end 12 and in a preferred embodiment is closed at the lower end 14.

The sleeve 10 comprises a first panel 20 and a second panel 22 which lie flatwise upon each other and are longitudinally sealed, connected, or otherwise continuous along first side 16 and second side 18. The sleeve 10 in its flattened, folded state further comprises a gusset 24 having a length 25 and which has a fold 26 extending between first side 16 and second side 18 whereby the gusset 24 is inwardly folded between first panel 20 and second panel 22. The gusset 24 comprises the expansion element in this embodiment. The fold 26 may be straight (i.e., FIG. 1 or 5A) or curved (FIG. 6A). An outer edge 27 of the gusset 24 is continuous with a lower edge 28 of first panel 20 and with a lower edge 30 of second panel 22 thereby forming the lower end 14 of the sleeve 10 in a closed and flattened condition. The lower edge 28 and lower edge 30 are convexly curved and therefore cause the sleeve 10 to have a convexly curved lower end 14. The first panel 20 has an outer surface 34 and an inner surface 36 and the second panel 22 has an outer surface 38 and an inner surface 40. The gusset 24 has an outer surface 44, and an inner surface 45. The inner surfaces 36, 40 and 45 of the first and second panels 20 and 22 and the gusset 24, respectively, together define the boundaries of an interior space 46 of the sleeve 10. In another embodiment, the sleeve has a sealed rounded lower end with no gusset, such as that shown in FIGS. 43 and 44 in U.S. Pat. No. 5,493,809, the specification and drawings of which are hereby incorporated herein by reference in their entirety.

Figure 3:
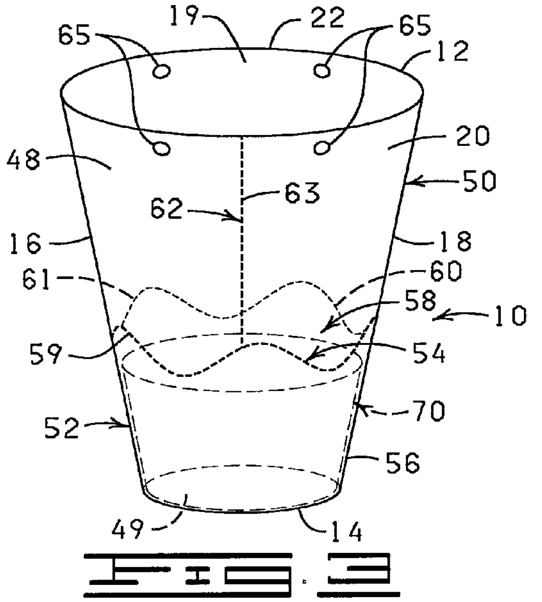
FIG. 3 is a perspective view of the sleeve of FIG. 1 in an open state with a pot disposed therein.

The construction of the lower end 14 of the sleeve 10, comprising the gusset 24 with the fold 26, permits the circular bottom of an object such as a potted plant to be disposed within the interior space 46 and therein causes a lower portion of the sleeve 10 to conform closely to the frusto-conical shape of the pot 70 as shown in FIG. 3 and described in detail below. Briefly, the bottom of the pot 70 rests upon at least a portion of the inner surface 45 of the gusset 24, and the outer sidewall of the pot 70 rest closely against at least a portion of each of the inner surface 36 and the inner surface 40 of the first and second panels 20 and 22, respectively. Once expanded, the sleeve 10 has a sidewall 48 and a bottom 49 for supporting the pot 70. The gusset 24 may be constructed from a separate material from the first and second panels 20 and 22 or, as will be clear to one of ordinary skill in the art, the gusset 24 may be constructed from the same web used to form the first and second panels 20 and 22 by sealing, then folding portions thereof. An example of how the gusset 24 may be formed from a separate sheet of material different from the web used to form the first and second panels 20 and 22 is shown in U.S. Pat. No. 3,380,646, issued to Doyen in FIGS. 9 and 10 and discussion thereof, which is incorporated herein by reference.

The sleeve 10 is demarcated into an upper portion 50 which is protective and a lower portion 52 which is decorative. The lower portion 52 of the sleeve 10 is sized to contain the pot 70 (FIG. 3) which is of a size standard in the floral industry and well known to persons of ordinary skill in the art. The upper portion 50 of the sleeve 10 is sized to substantially surround and encompass a floral grouping disposed in the pot 70. The sleeve 10 is demarcated into the upper portion 50 and the lower portion 52 by a detaching element 54 for enabling the detachment of the upper portion 50 of the sleeve 10 from the lower portion 52 of the sleeve 10. In the preferred version, the detaching element 54 is a plurality of perforations 61 in a crenulated or wavy pattern which extends circumferentially across the first panel 20 and second panel 22 of the sleeve 10 from the first side 16 to the second side 18. The term "detaching element", as used generally herein, means any element or combination of elements or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

In a preferred embodiment, as shown in FIGS. 1 and 3, the lower portion 52 of the sleeve 10 further comprises a base portion 56, and a skirt (or fringe) portion 58. The base portion 56 comprises that part of the lower portion 52 which, when the pot 70 is placed into the lower portion 52, has an inner peripheral surface which is substantially adjacent to and surrounds an outer peripheral surface of the pot 70. The skirt (or fringe) portion 58 comprises that part of the lower portion 52 which extends beyond an upper rim of the pot 70 and adjacent at least a portion of a floral grouping contained within the pot 70 and which is left to freely extend at an angle, inwardly or outwardly or upwardly, from the base portion 56 when the upper portion 50 of the sleeve 10 is detached from the lower portion 52 of the sleeve 10 by actuation of the detaching element 54. In the intact sleeve 10, the skirt portion 58 comprises an upper peripheral edge 59 congruent with the detaching element 54 which is connected to a lower peripheral edge 60, also congruent with the detaching element 54, of the upper portion 50 of the sleeve 10. In FIGS. 1 and 3, the upper peripheral edge 59 of the skirt portion 58 is congruent with a series of curved lines of the plurality of perforations 61 which together form an undulating line and comprise the detaching element 54.

Figure 4:
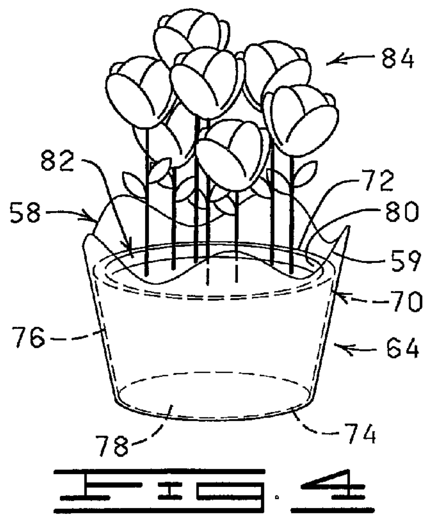
FIG. 4 is a perspective view of the sleeve of FIG. 3 after a flower pot has been disposed therein and an upper portion of the sleeve has been removed.

The upper portion 50 of the sleeve 10 may optionally have a vertical detaching element 62 indicated as a plurality of vertical perforations 63 for facilitating removal of the upper portion 50 and which are disposed more or less vertically therein extending between the detaching element 54 of the sleeve 10 and the upper end 12 thereof. The upper portion 50 of the sleeve 10 is separable from the lower portion 52 of the sleeve 10 by tearing the upper portion 50 along both the vertical detaching element 62 and the detaching element 54, thereby separating the upper portion 50 from the lower portion 52 of the sleeve 10. The lower portion 52 of the sleeve 10 remains disposed as the base portion 56 about the pot 70 and as the skirt portion 58 about a floral grouping 84, forming a decorative cover 64 as shown in FIG. 4, which substantially surrounds and encompasses the pot 70 and a portion of the floral grouping 84 therein. The upper portion 50 may have apertures 65 near the upper end 12 thereof so the sleeve 10 may be supported on a wicket (not shown).

As noted above, it will generally be desired to use the sleeve 10 as a covering for the plant or the floral grouping 84 contained within the pot 70, as shown in FIG. 4. The pot 70 has an upper end 72, a lower end 74, an outer peripheral surface 76, a bottom 78 and an inner peripheral surface 80 which encompasses an inner space 82 for retaining the floral grouping or plant 84. The lower end 74 of the pot 70 is generally closed but may have holes for permitting water drainage (not shown). The term "pot" as used herein refers to any type of container used for holding the floral grouping 84 or plant. Examples of pots used in accordance with the presently disclosed and claimed inventive concept(s) include, but not by way of limitation, clay pots, wooden pots, plastic pots, pots made from natural and/or synthetic fibers, or any combination thereof. The pot 70 is adapted to receive the floral grouping 84 in the inner space 82. The floral grouping 84 may be disposed within the pot 70 along with a suitable growing medium described in further detail below, or other retaining medium, such as a floral foam. It will also be understood that the floral grouping 84, and any appropriate growing medium or other retaining medium, may be disposed in the sleeve 10 without the pot 70.

The sleeve 10 is generally frusto-conically shaped, but the sleeve 10 may be, by way of example but not by way of limitation, cylindrical, frusto-conical, a combination of both frusto-conical and cylindrical, or square or rectangular in cross-section, or any other shape, including geometric, non-geometric, asymmetrical and/or fanciful as long as it functions in accordance with the presently disclosed and claimed inventive concept(s) described herein. The sleeve 10 may also be equipped with drains or ventilation holes (not shown), or can be made from permeable or impermeable materials.

The material from which the sleeve 10 is constructed has a thickness in a range from about 0.1 mil to about 30 mil. Often, the thickness of the sleeve 10 is in a range from about 0.5 mil to about 10 mil. Preferably, the sleeve 10 has a thickness in a range from about 1.0 mil to about 5 mil. More preferably, the sleeve 10 is constructed from a material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the presently disclosed and claimed inventive concept(s) as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, the specification of which is hereby incorporated herein by reference in its entirety. Any thickness of material may be utilized in accordance with the presently disclosed and claimed inventive concept(s) as long as the sleeve 10 may be formed as described herein, and as long as the formed sleeve 10 may contain at least a portion of the pot 70 or the floral grouping 84, as described herein. Additionally, an insulating material (not shown) such as bubble film, preferably one of two or more layers, can be utilized in order to provide additional protection for the item, such as the floral grouping 84, contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material. "Cling Wrap or Material" when used herein means any material which is capable of connecting to the sleeve 10 upon contacting engagement during the wrapping process and is wrappable about an item whereby portions of the cling material contactingly engage and connect to other portions of another material, or, alternatively, itself, for generally securing the sleeve 10 wrapped about at least a portion of the pot 70. This connecting engagement is preferably temporary in that the material may be easily removed, (i.e., the cling material "clings" to the pot 70).

The cling material is constructed and treated, if necessary, from polyethylene such as Cling Wrap made by Glad®, First Brands Corporation, Danbury, Conn. The thickness of the cling material will, in part, depend upon the size of the sleeve 10 and the size of the pot 70 in the sleeve 10, (i.e., generally, a larger pot 70 may require a thicker and therefore stronger cling material). The cling material will range in thickness from less than about 0.1 mil to about 10 mil, and preferably less than about 0.5 mil to about 2.5 mil, and most preferably from less than about 0.6 mil to about 2 mil. However, any thickness of cling material may be utilized in accordance with the presently disclosed and claimed inventive concept(s) which permits the cling material to function as described herein.

The sleeve 10 is constructed from any suitable material that is capable of being formed into a sleeve and wrapped about the pot 70 and the floral grouping 84 disposed therein. Preferably, the material comprises untreated or treated paper, metal foil, polymer film, non-polymer film, woven or nonwoven or synthetic or natural fabric, cardboard, fiber, cloth, burlap, or laminations or combinations thereof.

The term "polymer film" means a synthetic polymer such as a polypropylene or a naturally occurring polymer such as cellophane. A polymer film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping 84. The floral grouping 84 generally comprises a bloom or foliage portion and a stem portion. Preferably, the floral grouping 84 comprises a growing potted plant having a root portion (not shown) as well. However, it will be appreciated that the floral grouping 84 may consist of only a single bloom or only foliage, or a botanical item (not shown), or a propagule (not shown). The term "floral grouping" may be used interchangeably herein with any of the terms "floral arrangement", "potted plant" or "plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

Further, in accordance with the presently disclosed and claimed inventive concept(s), a bonding material may be disposed on a portion of the sleeve 10 to assist in holding the sleeve 10 to the pot 70 having the floral grouping 84 therein when the pot 70 is disposed within the sleeve 10 or to assist in closing the upper end 12 of the sleeve 10 or adhering the sleeve 10 to the pot 70 after the pot 70 has been disposed therein, as will be discussed in further detail below.

Preferably the bonding material, when present, is disposed as a strip or block on the inner surface 36 or 40 of the first and second panels 20 and 22 of the sleeve 10. The bonding material may also be disposed upon either outer surface 34 or 38 of the first and second panels 20 and 22 of the sleeve 10, as well as upon the pot 70. Further, the bonding material may be disposed as spots of bonding material, or in any other geometric, non-geometric, asymmetric, or fanciful form, and in any pattern including covering either the entire inner surfaces 36 and 40 and/or outer surfaces 34 and 38 of the first and second panels 20 and 22 of the sleeve 10 and/or the pot 70 or the decorative cover 64. The bonding material may be covered by a cover or release strip which can be removed prior to the use of the sleeve 10 or the decorative cover 64. The bonding material can be applied by means known to those of ordinary skill in the art. One method for disposing a bonding material, in this case an adhesive, is described in U.S. Pat. No. 5,111,637 entitled "Method For Wrapping A Floral Grouping" issued to Weder et al., on May 12, 1992, which has been incorporated herein by reference above.

The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to affect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

Figure 5A:
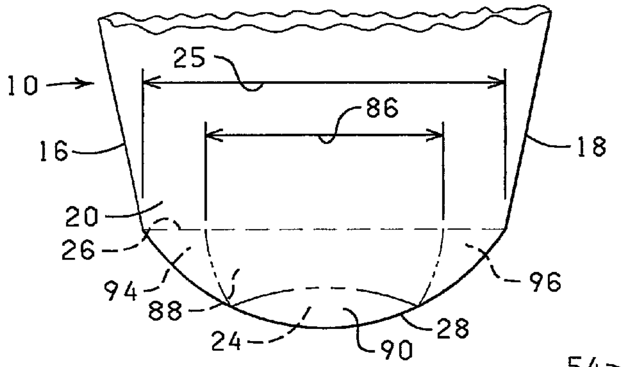
FIG. 5A is a fragmented perspective view of the sleeve of FIG. 1 with particular reference to a straight fold in the gusset.
Figure 5B:
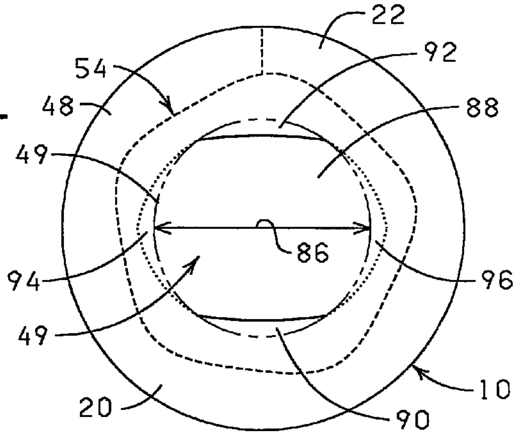
FIG. 5B is a bottom view of the sleeve of FIG. 5A when opened.
Figure 6A:
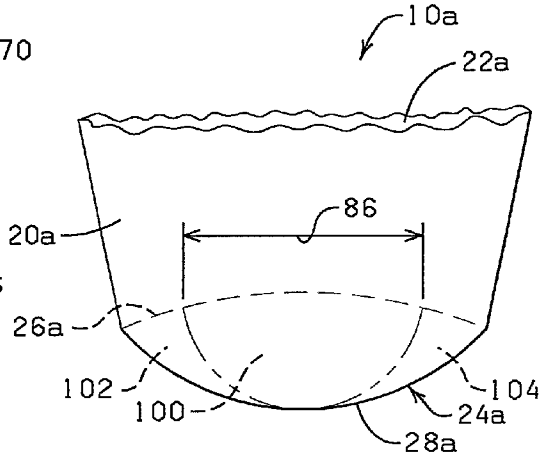
FIG. 6A is a fragmented perspective view of a sleeve like the sleeve of FIG. 5A but with a curved fold in the gusset.

The fold in the gusset 24 may be a straight fold 26 extending from the first side 16 to the second side 18, as shown in FIG. 5A, or the fold may be curved upwardly to form a fold 26*a* as explained below for FIG. 6A. When the fold is the straight fold 26, and when the pot 70 is inserted into the sleeve 10, the pot 70 which is sized to optimally fit therein has a bottom diameter 86 (FIGS. 5A and 5B). Bottom diameter 86 preferably is in a range of from about 0.5x to about 0.75x where "x" is the length 25 (FIG. 5A).

When the pot 70 is deposited into the sleeve 10 having the straight fold 26, a portion 88 of the gusset 24 is positioned against the bottom surface 78 of the pot 70 to form part of the bottom 49 of the sleeve 10. Additionally, a portion 90 of the first panel 20 forms another portion of the bottom 49 of the sleeve 10. Also, a portion 92 of second panel 22 which is a mirror image of portion 90 of the first panel 20 forms another portion of the bottom 49. Together, portions 88, 90 and 92 form the bottom 49 of the sleeve 10 in the expanded state as shown in FIG. 5B. Preferably, the bottom 49 of the open sleeve 10 conforms to the curvature of the circumference of the bottom 78 of the pot 70 (FIG. 5C).

Figure 5C:
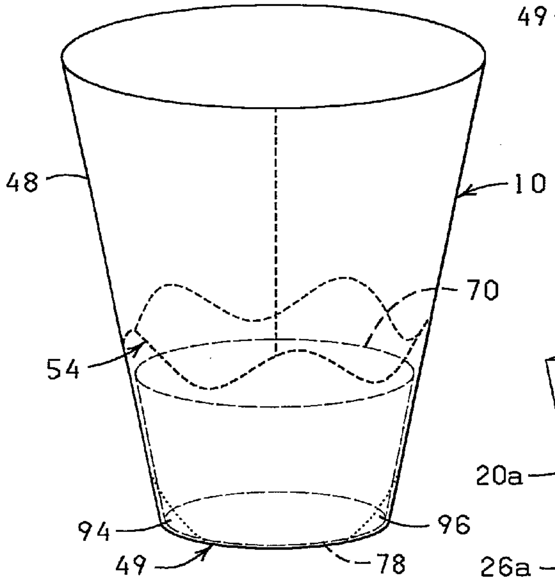
FIG. 5C is a perspective view of the sleeve of FIG. 5A when opened.

Further, when the pot 70 having the bottom diameter 86 is inserted into the sleeve 10, two mirror image side portions 94 and 96 of the gusset 24 (see FIG. 5A) become part of the side wall 48 of the expanded sleeve 10, as shown in FIGS. 5B and 5C. Thus, it can be seen then that in a preferred embodiment, the gusset 24 of the sleeve 10 in the flattened state surprisingly does not solely constitute the bottom 49 of the sleeve 10 in its expanded state. Rather, the bottom 49 is comprised of portions 90 and 92 of both first panel 20 and second panel 22, and of portion 88 of the gusset 24. Additionally, the side wall 48 of the expanded sleeve 10 is comprised of side portions 94 and 96 of the gusset 24 as well as of portions 90 and 92 of the first panel 20 and second panel 22. The side wall 48 conforms to the curvature and shape of the pot 70 disposed within the sleeve 10.

Figure 6B:
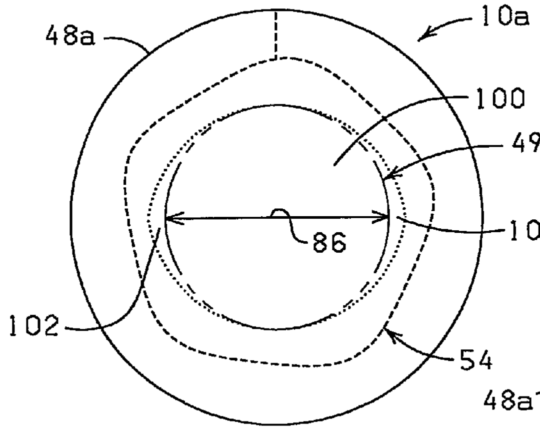
FIG. 6B is a bottom view of the sleeve of FIG. 6A when opened.
Figure 6C:
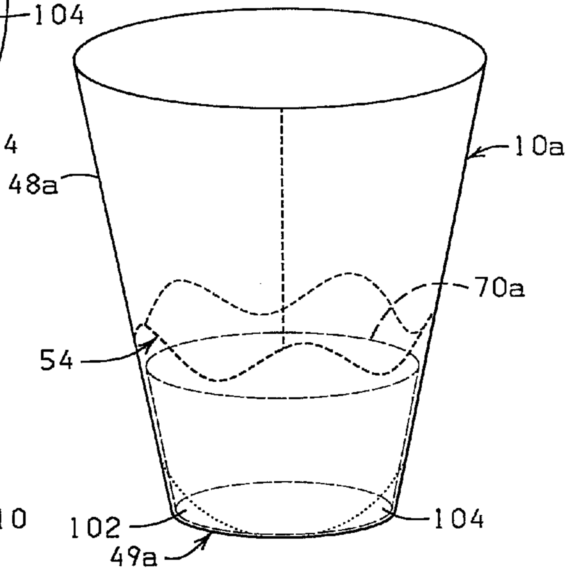
FIG. 6C is a perspective view of the sleeve of FIG. 6A when opened.

Alternatively, the fold in a gusset 24*a* may be curved, as represented by fold 26*a* in sleeve 10*a* in FIG. 6A. Fold 26*a* extends further inwardly between a first panel 20*a* and a second panel 22*a* toward an upper end of the sleeve 10*a* than does the straight fold 26 in the sleeve 10 shown in FIG. 5A. When the pot 70 is deposited into the sleeve 10*a* having the fold 26*a*, a circular portion 100 of the gusset 24*a* is positioned against the bottom 78 of the pot 70 to form a bottom 49*a* of the sleeve 10*a* and which also conforms to the curvature of the bottom 78 of the pot 70. Additionally, first and second mirror image side portions 102 and 104 of the gusset 24*a* become part of a sidewall 48*a* of the sleeve 10*a* when expanded, as shown in FIGS. 6B and 6C. It can be seen then that in one version of the presently disclosed and claimed inventive concept(s) having the fold 26*a* in the gusset 24*a* in the flattened state, the portion 100 of the gusset 24*a* comprises substantially the entire bottom 49*a* of the sleeve 10*a* when expanded and that the side wall 48*a* of the sleeve 10*a* is formed both from the first and second panels 20*a* and 22*a*, and from portions 102 and 104 of the gusset 24*a*. It will also be understood by one of ordinary skill in the art that the fold 26*a* in the gusset 24*a* may be intermediate in curvature between the straight fold 26 of FIG. 5A and the curved fold 26*a* of FIG. 6A (or even may be convex rather than concave) and therein may possess properties of the straight fold 26 but to a lesser degree. Any of the sleeves described anywhere herein which comprise a gusset may have a gusset having a straight fold, or a fold which is curved.

Embodiments of FIGS. 7-19

Figure 7:
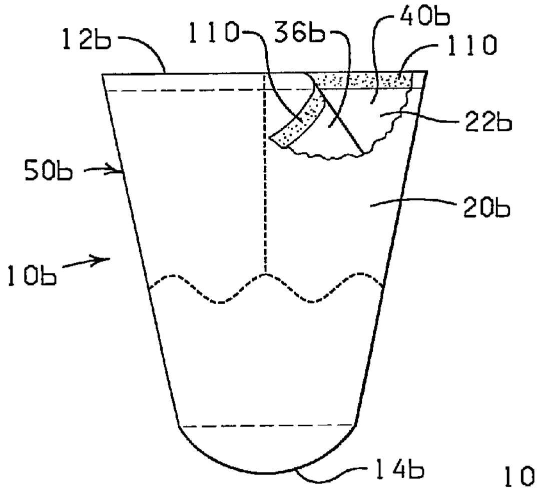
FIG. 7 is a partially cutaway, elevational view of a sleeve wherein a bonding material is disposed upon a portion of an upper end of the sleeve for sealing the sleeve.

Another version of the presently disclosed and claimed inventive concept(s) is shown as sleeve 10*b* in FIG. 7 and is exactly the same as the various embodiments of sleeves shown above or elsewhere herein except a strip of bonding material 110 is disposed on an inner surface 36*b* and/or 40*b* of a first and a second panel 20*b* and 22*b* such that an upper portion 50*b* of the sleeve 10*b* generally in the vicinity of an upper end 12*b* of the sleeve 10*b* can be sealed for enclosing the upper portion 50*b* of the sleeve 10*b* about the pot 70 and the floral grouping 84 disposed therein (not shown).

Figure 8:
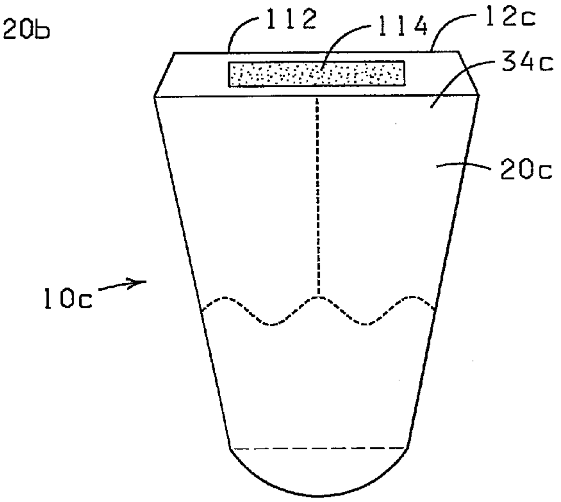
FIG. 8 is an elevational view of a sleeve having a folding flap for sealing the sleeve.

Another version of the presently disclosed and claimed inventive concept(s) is shown in FIG. 8 and is exactly the same as the various embodiments of sleeves shown above or elsewhere herein except the sleeve, designated as sleeve 10*c*, includes a flap 112 positioned at an upper end 12*c* which can be folded over and sealed with a flap bonding strip 114 to an adjacent portion of an outer surface 34*c* of a first panel 20*c* of the sleeve 10*c* near the upper end 12*c* thereof. Other versions of the sleeve (not shown) may comprise ventilation holes or drainage holes for allowing movement of gases or moisture to and away from the inner space of the sleeve.

Figure 9:
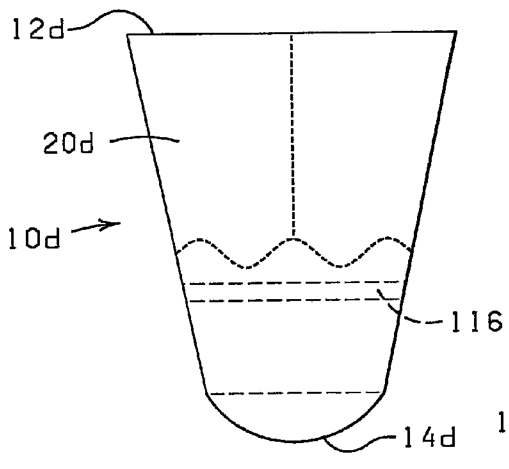
FIG. 9 is an elevational view of a sleeve having a bonding material disposed on an inner portion of the sleeve for bonding the sleeve to a pot.

Another version of the presently disclosed and claimed inventive concept(s) is shown in FIG. 9 and is exactly the same as the various embodiments of sleeves shown above or elsewhere herein except the sleeve, designated as sleeve 10*d*, further includes an inner strip of bonding material 116 disposed upon a portion of either of inner surfaces 36*d* or 40*d* (not shown) of a first panel 20*d* or a second panel 22*d* (not shown) of the sleeve 10*d*. The strip of bonding material 116 functions to enable portions of either the inner surface 36*d* or the inner surface 40*d* to be bondingly connected to an outer peripheral surface of a pot disposed therein causing the sleeve 10*d* to be bondingly connected to the pot (not shown).

In another version of the presently disclosed and claimed inventive concept(s), after the pot has been disposed within the sleeve, the bonding material on the pot may be used to crimp a portion of the sleeve to secure the sleeve in a position about the pot. A description of a preferred crimping method is shown in FIGS. 10-13, and described on pages 30-31, lines 10 through 2, in U.S. Pat. No. 5,625,979, which is hereby incorporated herein by reference. A description of other methods which may be used in a crimping process in accordance with the presently disclosed and claimed inventive concept(s) is shown in FIGS. 5-7, and 15-20, and the corresponding description in U.S. Pat. No. 5,526,932, which is hereby incorporated herein by reference in its entirety.

Figure 10:
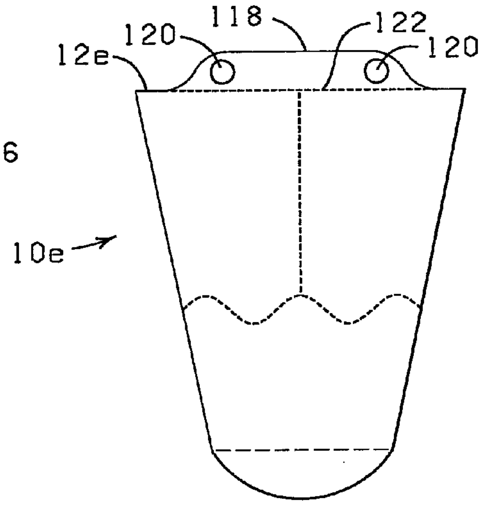
FIG. 10 is an elevational view of a sleeve having an extended portion serving as a support extension.

Another embodiment is shown in FIG. 10 and is exactly the same as the various embodiments of sleeves shown above or elsewhere herein except the sleeve, designated as 10*e*, may further include an extended portion comprising a support extension 118 which extends away from a portion of an upper end 12*e* of the sleeve 10*e*. The support extension 118 has one or more apertures 120 disposed therein for allowing the sleeve 10*e* to be supported on a support assembly (not shown) which is commercially available and known by one of ordinary skill in the art, such as a pair of wickets for shipment, storage, assembly of the sleeve 10*e*, placement of a pot within the sleeve 10*e*, or other functions known in the art. The support extension 118 may have a plurality of perforations 122 or other detaching element for allowing the support extension 118 to be removed from the upper end 12*e* of sleeve 10*e* after the sleeve 10*e* has been provided for use as described elsewhere herein.

Figure 11:
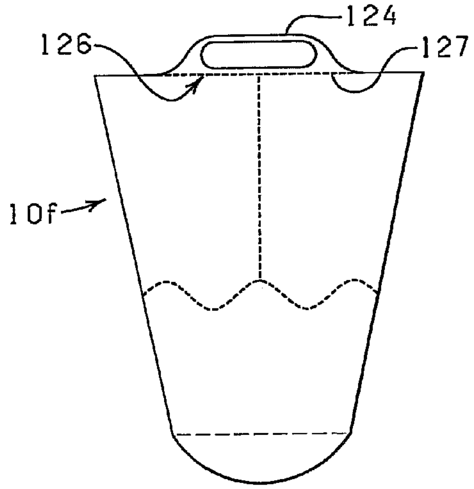
FIG. 11 is an elevational view of a sleeve having an extended portion serving as a handle.

Another version of the presently disclosed and claimed inventive concept(s) is shown in FIG. 11 and is exactly the same as the various embodiments of sleeves shown above and elsewhere herein except the sleeve, designated as sleeve 101, has an extended portion comprising a handle 124 for carrying a potted plant package (not shown) by the sleeve 10*f*. The sleeve 101 may further include a detaching element 126 comprising a plurality of perforations 127 for removing the handle 124 at a later time.

The sleeves described herein may be formed by intermittently advancing two separate webs, one or two webs preformed in the form of a tube, or a single web folded double and sealing the longitudinal sides and bottom of the two facing panels, then cutting the sleeve thus formed from the webs or web. Machines which can form sleeves from such single webs or pairs of webs are well within the knowledge of one of ordinary skill in the art.

Figure 12:
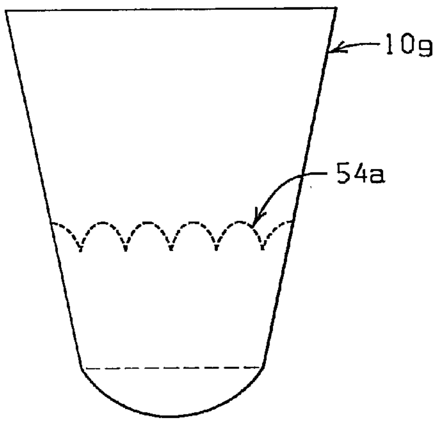
FIG. 12 is an elevational view of a sleeve showing an alternate pattern of perforations.
Figure 13:
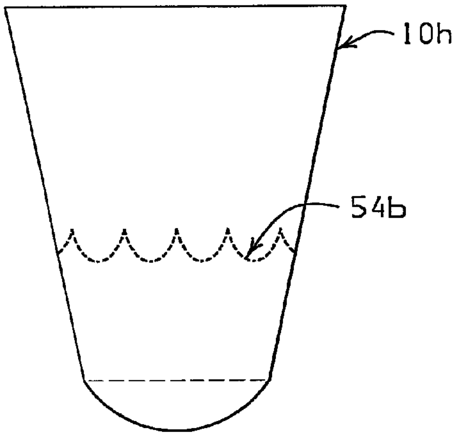
FIG. 13 is an elevational view of a sleeve showing another perforation pattern.
Figure 14:
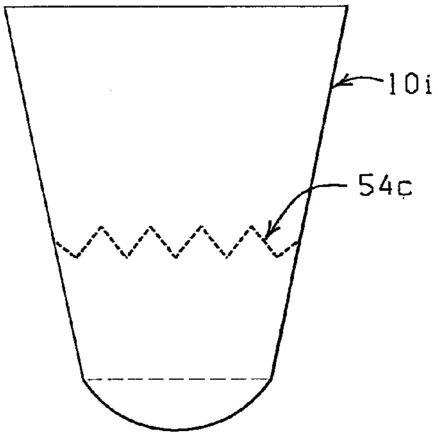
FIG. 14 is an elevational view of a sleeve showing another perforation pattern.
Figure 15:
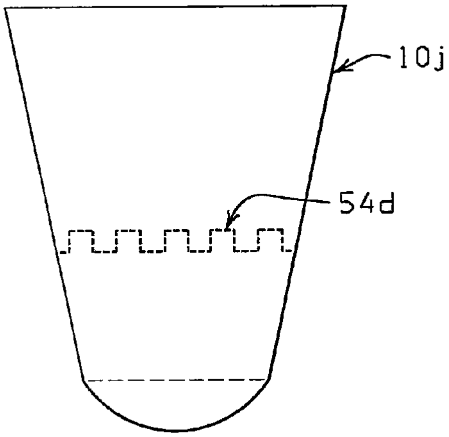
FIG. 15 is an elevational view of a sleeve showing another perforation pattern.
Figure 16:
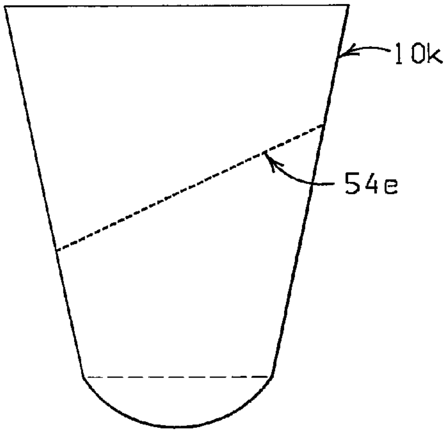
FIG. 16 is an elevational view of a sleeve showing another perforation pattern.

As shown in FIG. 1, the detaching element 54 is preferably the line of perforations 61 having a regular or irregular curved or wavy pattern on both the first panel 20 and the second panel 22, which extend from the first side 16 to the second side 18. It will be understood that the line of perforations 61 in any of the sleeves described herein may be constructed in any number of other decorative patterns, several being shown in FIGS. 12-16. For example, FIG. 12 shows a detaching element 54*a* having a crenate or scalloped pattern in a sleeve 10*g*. FIG. 13 shows a detaching element 54*b* having a crenate or scalloped pattern in a sleeve 10*h* which is inverted. FIG. 14 shows a detaching element 54*c* having a crenellate toothed or zig-zag pattern in a sleeve 10*i*. FIG. 15 shows a detaching element 54*d* having a crenellated or rectangular-shaped pattern in a sleeve 10*j*. FIG. 16 shows a detaching element 54*e* having a diagonal pattern slanted upwardly from one side of a sleeve 10*k* to the other side of the sleeve 10*k*. One of ordinary skill in the art will understand these are but a few of the patterns that the perforations may form and one of ordinary skill could contemplate many other suitable patterns.

Figure 17:
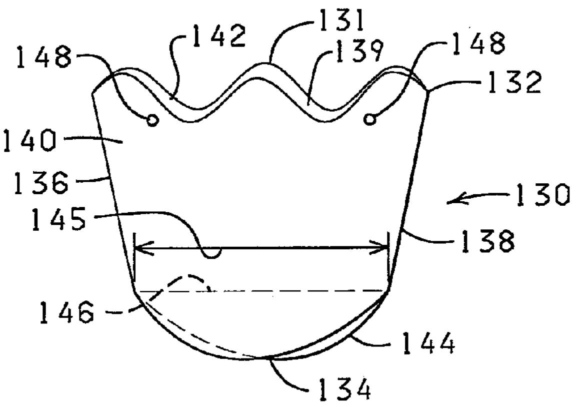
FIG. 17 is a perspective view of a sleeve like the sleeve of FIG. 1 but without an upper sleeve portion.

In another embodiment, the sleeve designated in FIG. 17 as sleeve 130 is formed exactly as any of the versions of the sleeves described herein except that it is formed without an upper protective portion. In this version, the sleeve 130 serves as a decorative cover and may be formed with or without a decorative skirt portion or decorative border which extends from or comprises an upper edge 131 of the sleeve 130.

The sleeve 130 has an upper end 132, a lower end 134, a first side 136, and a second side 138. The sleeve 130 has an opening 139 at the upper end 132 and is closed at the lower end 134. The sleeve 130 comprises a first panel 140 and a second panel 142 which lie flatwise upon each other and are longitudinally sealed, connected or otherwise continuous along first side 136 and second side 138 of the sleeve 130. The sleeve 130 further comprises a gusset 144 having a length 145 and which has a fold 146 extending between the first and second sides 136 and 138 whereby the gusset 144 is inwardly folded between the first and second panels 140 and 142. The inwardly folded gusset 144 comprises the expansion element in this embodiment. The fold 146 may be straight or curved as described above for sleeves 10 and 10*a* in FIGS. 5A and 6A, respectively, and functions in a similar manner. As shown here, the sleeve 130 has essentially the same construction as sleeve 10, or any other sleeves shown elsewhere herein, except it is not formed with a detachable upper portion. As for the sleeve 10, the construction of the lower end 134 of the sleeve 130 comprising the rounded gusset 144 with the fold 146, permits the circular bottom of an object such as a pot or potted plant to be disposed therein causing the lower portion of the sleeve 130 to conform closely to the frusto-conical shape of the pot 70 as shown in FIG. 4 and described in detail elsewhere herein.

The sleeve 130, thus formed, may be equipped with or absent apertures 148 near the upper end 132 for enabling the sleeve 130 to be placed on a wicket (not shown) for transport and ease of handling. The sleeve 130 may further be constructed with the upper end 132 having a border having a shape like any of the perforation patterns of detaching elements described elsewhere herein, for example, in sleeves 10*g*-10*k* of FIGS. 12-16.

Figure 18:
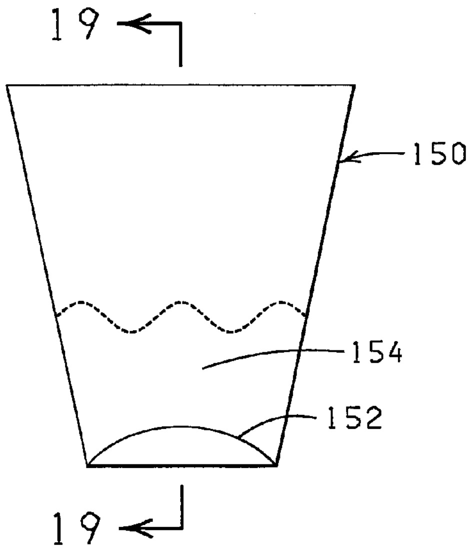
FIG. 18 is an elevational view of a sleeve like the sleeve of FIG. 1 but with the gusset folded outwardly.
Figure 19:
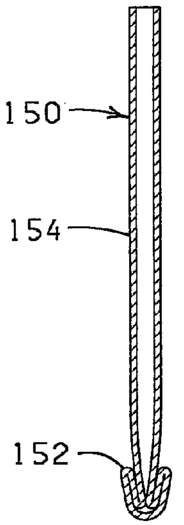
FIG. 19 is a cross-sectional view of the sleeve of FIG. 18 taken along line 19-19.

Another embodiment of the presently disclosed and claimed inventive concept(s) is shown in FIGS. 18-19 and is designated by the reference numeral 150. Sleeve 150 is exactly the same as sleeve 10 or any of the other gusseted sleeves described herein except that sleeve 150 includes a gusset 152 which is outwardly folded back upon an outer surface 154 of the sleeve 150 rather than inwardly folded as in sleeve 10.

Embodiments and Methods of Use of FIGS. 20-34

Figure 20:
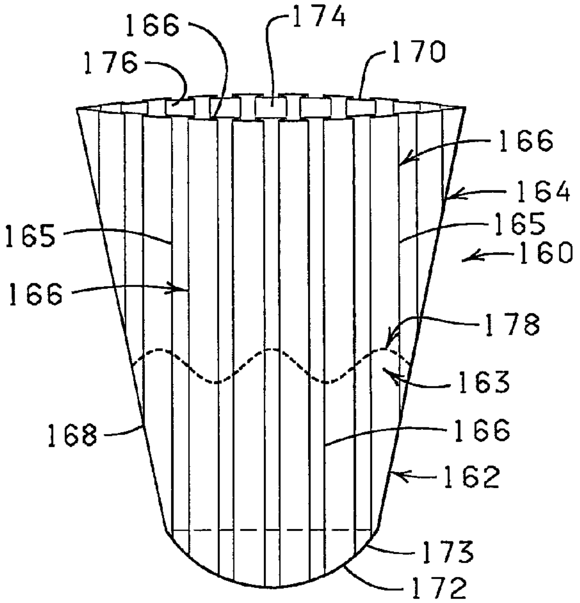
FIG. 20 is a perspective view of a sleeve like the sleeve of FIG. 1 but having pleats.

Attention is now drawn to the versions of the presently disclosed and claimed inventive concept(s) which are shown in FIGS. 20-34 and more specifically to the sleeve in FIG. 20 which is designated therein by the reference numeral 160, and which is the same as the sleeves described elsewhere herein except for the differences described below. The sleeve 160, comprises a unitary construction and has a lower portion 162, an optional skirt portion 163 (not shown herein but which is described in U.S. Pat. No. 5,625,979, the specification of which is hereby incorporated herein by reference in its entirety), an upper portion 164 and a plurality of pleats 165 comprising expansion elements 166 (only a few of which are specifically designated as such in FIG. 20) and further has an outer peripheral surface 168, an open upper end 170 and a closed lower end 172, which in FIG. 20 is rounded. The sleeve 160, like the sleeves discussed elsewhere herein, has an inner retaining space 174 which extends from the open upper end 170 to the closed lower end 172 and which is bounded by an inner peripheral surface 176 of the sleeve 160. The lower portion 162 is sized to substantially cover the outer peripheral surface 76 of the pot 70 as described elsewhere herein and the upper portion 164 is sized to substantially surround the floral grouping 84 within the pot 70 which is disposed within the inner retaining space 174 of the sleeve 160.

The upper portion 164 is detachable from the lower portion 162 via a detaching element 178 such as is described in detail with regard to sleeve 10 above. The expansion elements 166 are integral to at least a portion of the lower portion 162 and upper portion 164, as shown in FIG. 20. The expansion elements 166 function to allow expansion of a portion of the lower portion 162 about the bottom 78 and/or outer peripheral surface 76 of the pot 70 disposed therein so that the lower portion 162 fits closely thereto, as described in more detail above for sleeve 10 and for other sleeves described herein.

As shown in FIG. 20, each expansion element 166 of the sleeve 160 comprises one or more areas of excess material shaped in the form of a pleat 165. The expansion element 166 may also be positioned so that portions of the skirt portion 163, when present, can be extended angularly from the lower portion 162 forming the skirt portion 163 about a portion of the floral grouping 84 of the pot 70 as shown in U.S. Pat. No. 5,625,979, referred to above.

Figure 21:
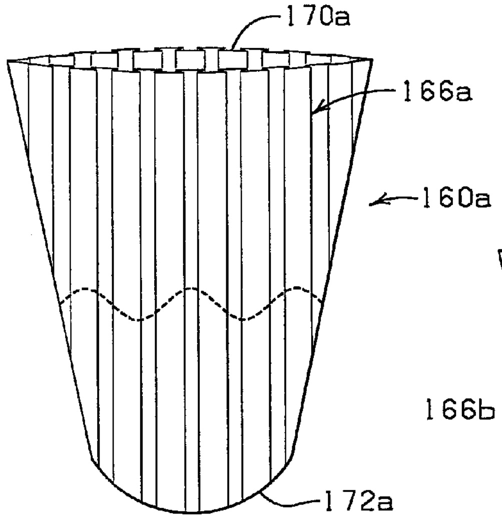
FIG. 21 is a perspective view of a sleeve like the sleeve of FIG. 20 but having a rounded bottom with no gusset.
Figure 22:
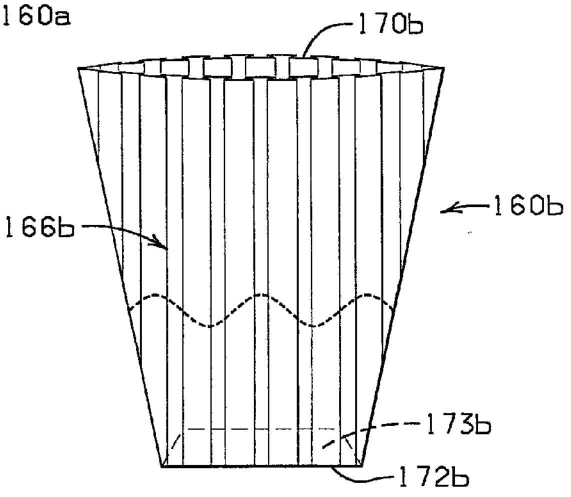
FIG. 22 is a perspective view of a sleeve like the sleeve of FIG. 20 but having a straight bottom.
Figure 23:
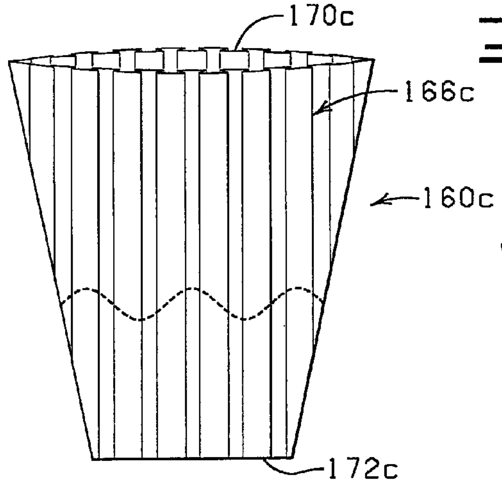
FIG. 23 is a perspective view of a sleeve like the sleeve of FIG. 20 but having a straight bottom and no gusset.

The closed lower end 172 of the lower portion 162 may be constructed in a variety of configurations. For example, the closed lower end 172 may have a rounded bottom with a gusseted inverted portion 173 (FIG. 20). FIG. 21 shows an alternative embodiment of a sleeve 160*a* having expansion elements 166*a* and having a closed lower end 172*a* which is rounded without a gusset. FIG. 22 shows an alternative embodiment of a sleeve 160*b* having expansion elements 166*b* and having a straight closed lower end 172*b* with a gusseted inverted portion 173*b* to allow further expansion of the closed lower end 172*b*. FIG. 23 shows a sleeve 160*c* having expansion elements 166*c* and having a closed lower end 172*c* which is straight across without a gusset.

Figure 24:
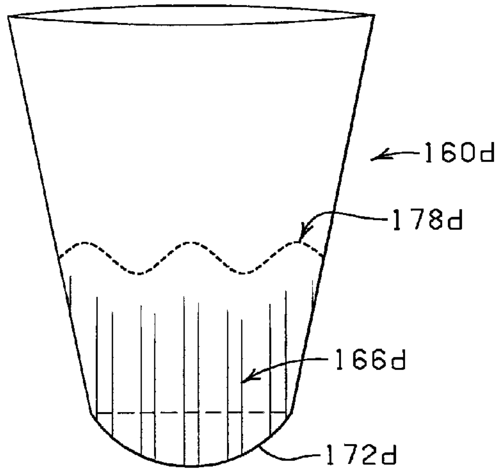
FIG. 24 is a perspective view of a sleeve like the sleeve of FIG. 20 but having pleats extending only to near the perforations.
Figure 25:
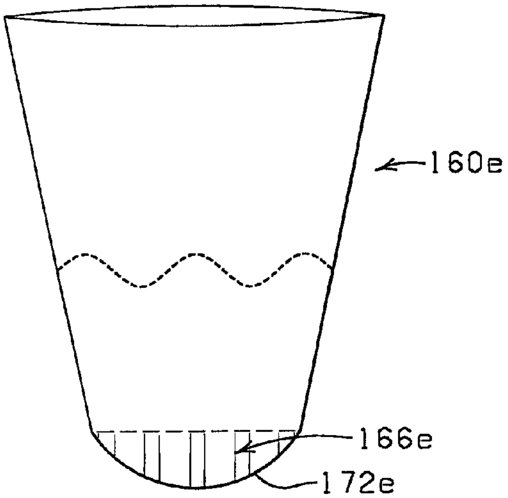
FIG. 25 is a perspective view of a sleeve like the sleeve of FIG. 20 but having pleats extending just a short distance above a lower end thereof.
Figure 26:
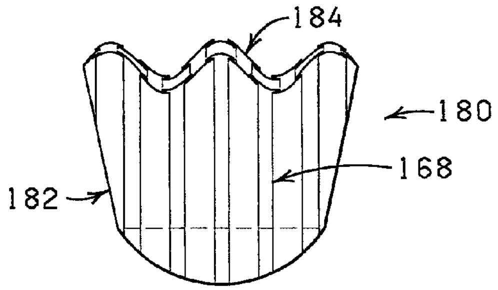
FIG. 26 is a perspective view of a sleeve like the sleeve of FIG. 20 but without an upper sleeve portion.
Figure 27:
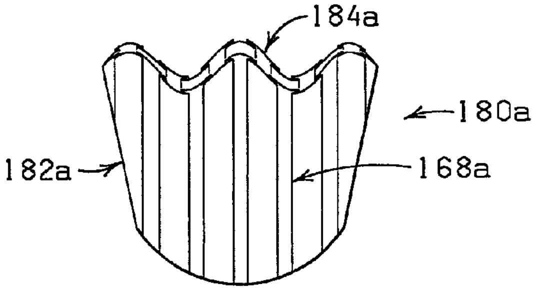
FIG. 27 is a perspective view of a sleeve like the sleeve of FIG. 21 but without an upper sleeve portion.
Figure 28:
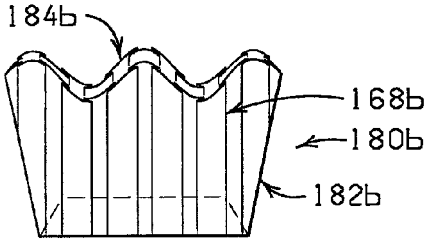
FIG. 28 is a perspective view of a sleeve like the sleeve of FIG. 22 but without an upper sleeve portion.
Figure 29:
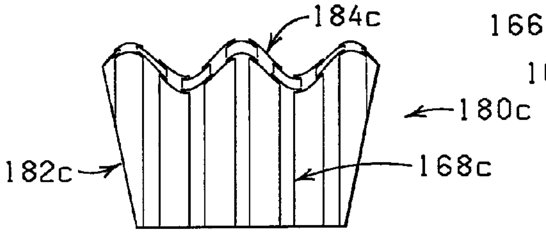
FIG. 29 is a perspective view of a sleeve like the sleeve of FIG. 23 but without an upper sleeve portion.
Figure 30:
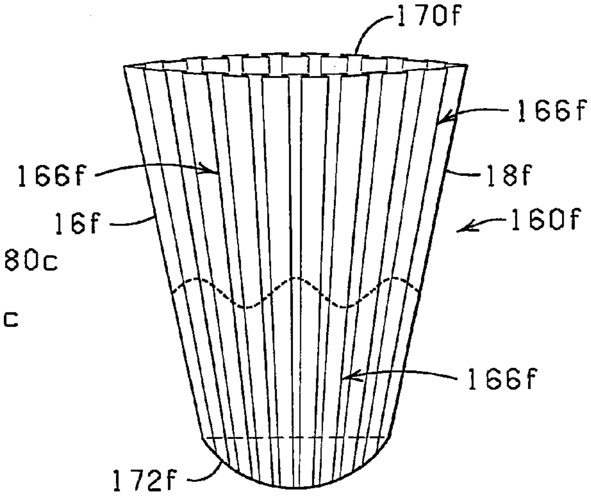
FIG. 30 is a perspective view of a sleeve like the sleeve of FIG. 20 but wherein the pleats do not intersect the sides.

As noted above, the expansion elements 166-166*c* may extend the entire distance between the closed lower ends 172-172*c* and the open upper ends 170-170*c*, as shown in FIGS. 20-23, respectively. Alternatively, the expansion elements 166-166*c* may extend from any position intermediate between the closed lower ends 172-172*c* and the open upper ends 170-170*c*, respectively. For example, expansion elements 166*d* of sleeve 160*d* are shown to extend from a closed lower end 172*d* of the sleeve 160*d* to near or just below a detaching element 178*d*, as shown in FIG. 24. Alternatively, expansion elements 166*e* may extend from a closed lower end 172*e* of a sleeve 160*e* to a distance just above the closed lower end 172*e*, as shown in FIG. 25.

In another set of embodiments shown in FIGS. 26-29, sleeves 180-180*c* having expansion elements 168-168*c*, respectively, are formed exactly as described above for sleeves 160-160*c*, respectively, and function in the same way, but are formed without upper portions. In these versions, lower portions 182-182*c* serve as decorative covers and may be formed with decorative skirt portions 184-184*c*, respectively, which extend from the sleeves 180-180*c* or may have a decorative border as described elsewhere herein.

The presently disclosed and claimed inventive concept(s) also contemplates sleeves (not shown) which are similar to sleeves 180-180*c* but have expansion elements positioned in the manner shown for sleeves 160*d* and 160*e*. Further, the presently disclosed and claimed inventive concept(s) contemplates sleeves, with or without upper portions, wherein the expansion elements are not in the side panels but are found only in the gusseted portions. It is further contemplated that in those sleeves with gusseted portions, the expansion elements may be positioned in both the gusseted portion and first and second panel portions, or only in the first and second panel portions, or in only one of the first or second panel portions.

It is also noted that in the embodiments of the sleeves shown in FIGS. 20-29, the expansion elements 166-166*e* and 168-168*c* are substantially parallel. However, it is further contemplated that any of the pleated sleeves specifically described or otherwise contemplated herein may comprise a plurality of expansion elements 166*f*, each of which extends from an open upper end 170*f* to a closed lower end 172*f* of the sleeve as shown in sleeve 160*f* in FIG. 30. That is, the expansion elements 166*f* do not intersect with the first and second sides 16*f* and 18*f* of the sleeve 160*f* but rather tend to converge from the open upper end 170*f* to the closed lower end 172*f*.

Figure 31:
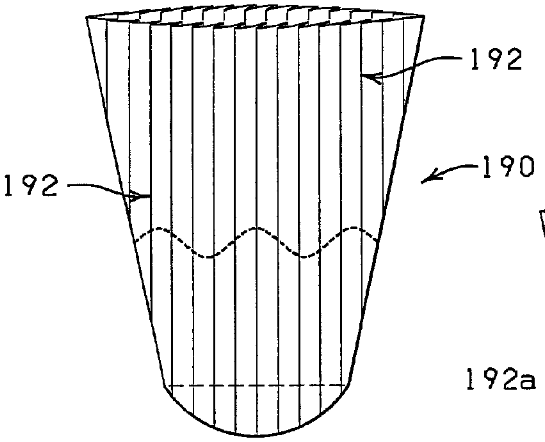
FIG. 31 is a perspective view of a sleeve like the sleeve of FIG. 20 but having z-shaped pleats.
Figure 32:
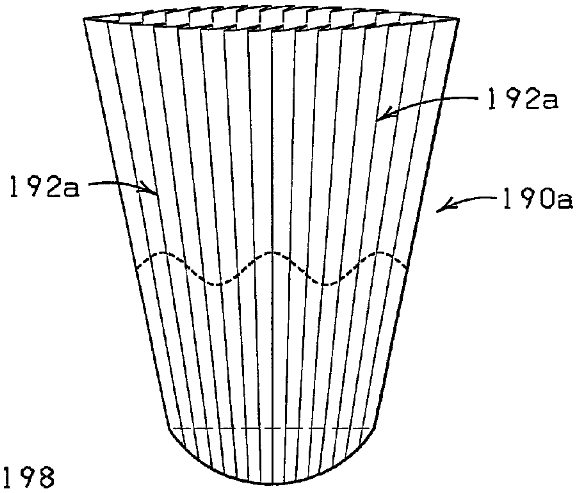
FIG. 32 is a perspective view of a sleeve like the sleeve of FIG. 30 but having z-shaped pleats.

Attention is now drawn to FIG. 31 and to the sleeve shown therein which is designated by the general reference numeral 190. Sleeve 190 is exactly the same as sleeve 160 in FIG. 20 except that the sleeve 190 has a plurality of z-shaped pleated expansion elements 192. The expansion elements 192 of sleeve 190 serve the same purpose as the pleated expansion elements 166 of sleeve 160. FIG. 32 shows a sleeve 190*a* which is constructed like sleeve 90 but has a plurality of expansion elements 192*a* which are positioned in the same manner as the expansion elements 166*f* of sleeve 160*f* in FIG. 30.

Figure 33:
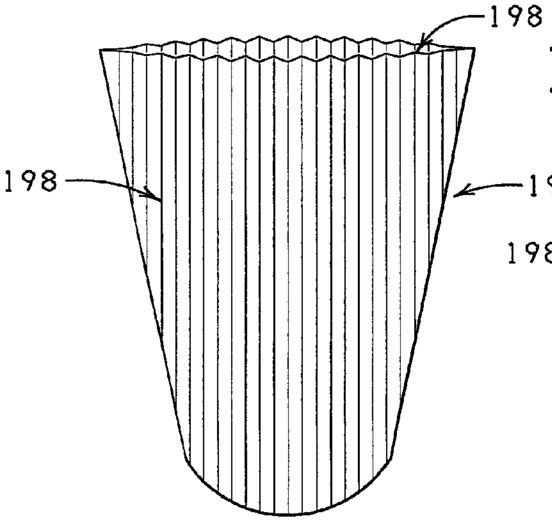
FIG. 33 is a perspective view of a sleeve like the sleeve of FIG. 20 but having fluted folds.
Figure 34:
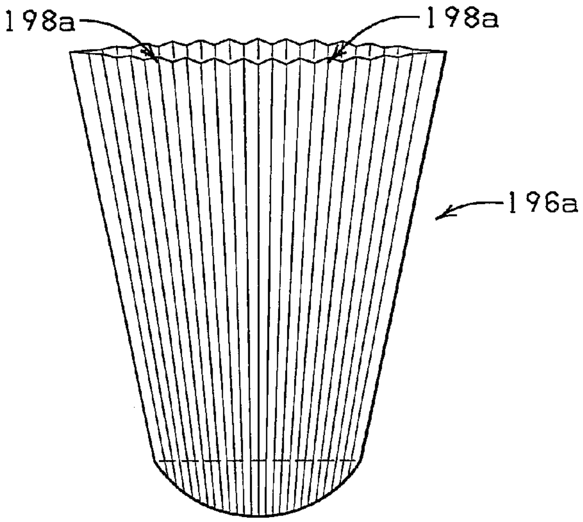
FIG. 34 is a perspective view of a sleeve like the sleeve of FIG. 30 but having fluted folds.

Attention is now drawn to FIG. 33 and to a sleeve shown therein which is designated by the general reference numeral 196. Sleeve 196 is exactly the same as sleeve 160 in FIG. 20 or the sleeve 190 in FIG. 31 except that the sleeve 196 has a plurality of fluted or groove-shaped expansion elements 198 which serve the same purpose as the pleated expansion elements 166 of sleeve 160 and can expand to cause the sleeve 196 to fit closely to the bottom 78 and outer peripheral surface 76 of the pot 70 to form a decorative cover about a portion of the pot 70. It will be understood that the sleeve 196 comprising the plurality of fluted or groove-shaped expansion elements 198 may be constructed in the same embodiments as described above, for example in FIGS. 21-30 and as described and contemplated elsewhere herein. FIG. 34, for example, shows a sleeve 196*a* having a plurality of expansion elements 198*a* positioned in the same converging way as the expansion elements 166*f* of sleeve 160*f* in FIG. 30 or as the expansion elements 192*a* in sleeve 190*a*.

It will be appreciated by one of ordinary skill in the art that the shapes of the expansion elements described above are but several of the shapes which can be contemplated for the presently disclosed and claimed inventive concept(s). Other shapes which may be contemplated are gussets, fans, and "accordion-folds" to name but a few.

Embodiments and Methods of Use of FIGS. 35-41

Figure 35:
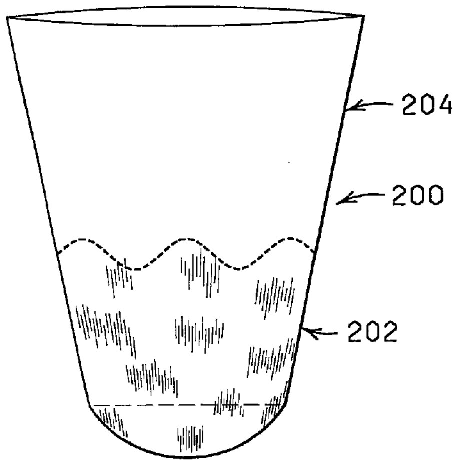
FIG. 35 is a perspective view of a sleeve like the sleeve in FIG. 1 but having an elastomeric lower portion.

Shown in FIG. 35 and referred to therein by reference numeral 200 is another version of a sleeve constructed in accordance with the presently disclosed and claimed inventive concept(s). The sleeve 200 and versions thereof are the same in all respects to the various embodiments of the sleeves described elsewhere herein except the expansion element is constructed from an elastomeric material. The sleeve 200 has an elastomeric lower portion 202 constructed of material having elastomeric properties which allows the elastomeric lower portion 202 to expand when the pot 70 is disposed within the sleeve 200 when the elastomeric lower portion 202 of the sleeve 200 is stretched about a lower end 74 of the pot 70. The elastomeric lower portion 202 may be comprised of lycra, rubber, elasticized fabrics, or any other sheet materials which have elastic properties. The elastomeric lower portion 202 of the sleeve 200 will grip the adjacent portion of the pot 70 and will cause the elastomeric lower portion 202 of the sleeve 200 to closely conform to the shape of the pot 70 and will secure the sleeve 200 to the pot 70 leaving substantially no void space as explained above. The sleeve 200 preferably has an upper portion 204 constructed from the same material as non-elastomeric sleeves described herein above.

The elastomeric lower portion 202 may be a separate component connected to a lower end 205 of the upper portion 204 of the sleeve 200. Alternatively, the lower elastomeric portion 202 may be of unitary construction with the upper portion 204 of the sleeve 200 which is non-elastomeric. The elastomeric lower portion 202 may be an elasticized or rubberized extension of upper portion 204. For example, the sleeve 200 may be constructed from a fabric which is impregnated with an elastic material in one portion to form the elastomeric lower portion 202.

Figure 36:
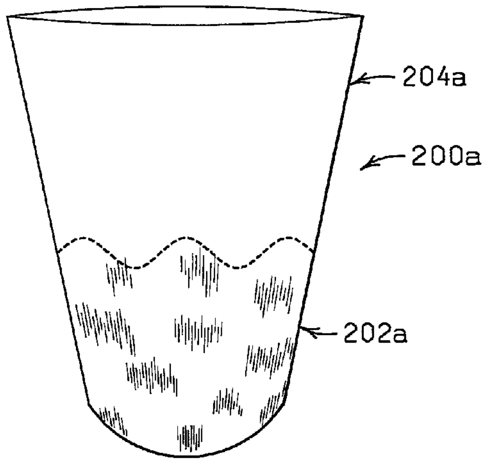
FIG. 36 is a perspective view of a sleeve like the sleeve in FIG. 35 but without a gusset.
Figure 37:
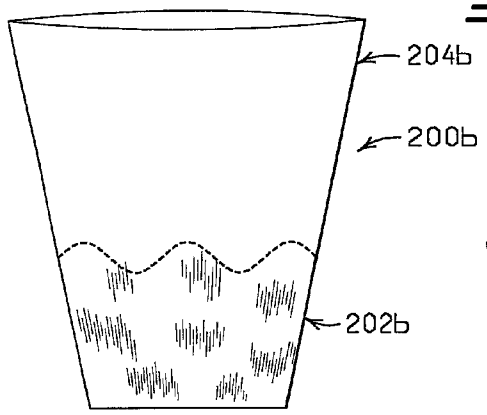
FIG. 37 is a perspective view of a sleeve like the sleeve in FIG. 36 but with a straight lower end.
Figure 38:
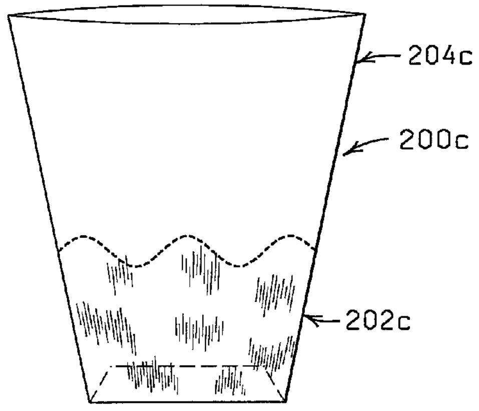
FIG. 38 is a perspective view of a sleeve like the sleeve in FIG. 37 but with a gusset.
Figure 39:
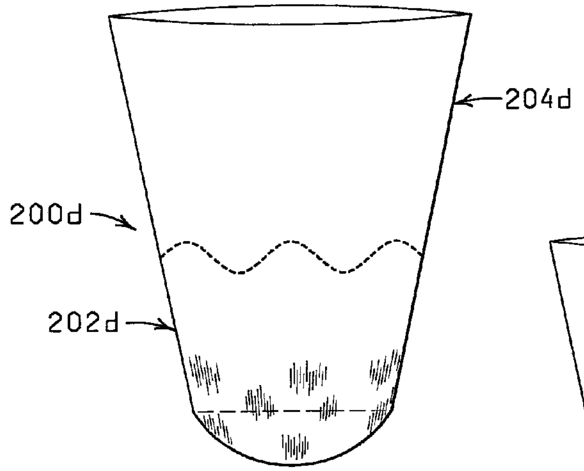
FIG. 39 is a perspective view of a sleeve like the sleeve in FIG. 35 but wherein the elastomeric portion extends only partially up from a lower end on a lower portion.
Figure 40:
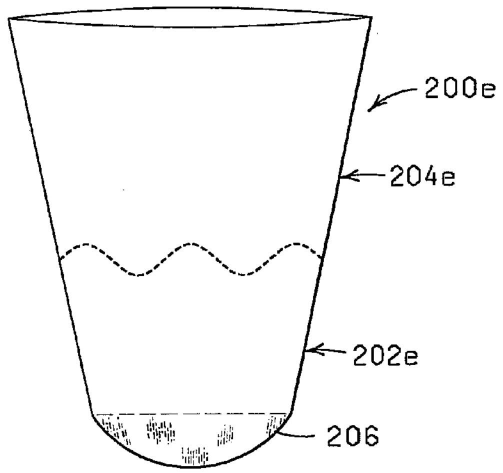
FIG. 40 is a perspective view of a sleeve like the sleeve of FIG. 35, but wherein the elastomeric portion is only on a gusset thereof.
Figure 41:
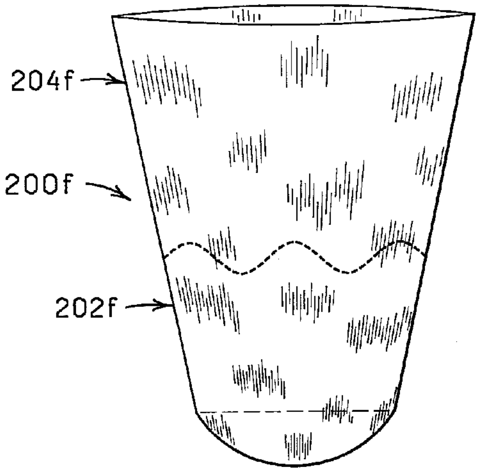
FIG. 41 is a perspective view of a sleeve like the sleeve in FIG. 35, but wherein an elastomeric portion extends over most of the surface of the sleeve.

Shown in FIGS. 36, 37 and 38 are sleeves 200*a*, 200*b*, and 200*c*, having lower portions 202*a*, 202*b*, and 202*c*, respectively, and having upper portions 204*a*, 204*b* and 204*c*, respectively, which represent alternative versions of the presently disclosed and claimed inventive concept(s) which are similar to the sleeves 160*a*-160*c*, respectively, in FIGS. 21-23. The sleeves 200*a*-200*c* comprising lower portions 202*a*-202*c* with elastomeric properties may further be constructed like sleeves 180-180*c* in FIGS. 26-29, respectively, that is, without upper portions 204*a*-204*c*. In another series of versions, the presently disclosed and claimed inventive concept(s) contemplates sleeves having expansion elements similar to those of FIGS. 20-34 and which also have elastomeric properties.

The elastomeric material of the sleeves 200-200*c* may comprise most or all of the elastomeric lower portions 202-202*c* of the sleeves 200-200*c* as shown in FIGS. 35-38. Alternatively, the elastomeric material may comprise only a portion of the lower portion of the sleeve as shown in a lower portion 202*d* of a sleeve 200*d* (FIG. 39), also having upper portion 204*d*. Or, the elastomeric material may comprise only a gusset portion 206 as shown in sleeve 200*e* in FIG. 40, also having upper portion 204*e* and lower portion 202*e*.

It will be understood that the elastomeric lower portion, when expanded about the pot 70, may cover only the bottom 78 of the pot 70, or may cover the bottom 78 of the pot 70 and a portion of the outer peripheral surface 76 of the pot 70 above the bottom 78 of the pot 70. In yet another version (not shown) of the elastomeric sleeve, the elastomeric portion of the sleeve may be constructed in such a way that the bottom 78 of the pot 70 disposed within the sleeve may be covered by a non-elastomeric portion of the sleeve, while a portion of the outer peripheral surface 76 of the pot 70 is the portion surrounded by the elastomeric portion of the sleeve. The elastomeric portion of the sleeve functions to eliminate or minimize the void space between the inner surface of the sleeve and the outer peripheral surface 76 or bottom 78 of the pot 70. Finally, the elastomeric portion may comprise the entire sleeve, as shown in sleeve 200*f* in FIG. 41, which has lower portion 202*f* and upper portion 204*f*.

Embodiments and Methods of Use of FIGS. 42-58

Figure 42:
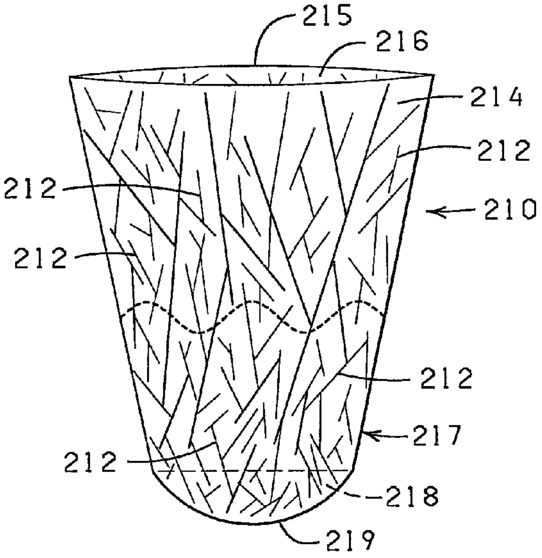
FIG. 42 is a perspective view of a sleeve like the sleeve in FIG. 20, but rather than having pleats, having randomly positioned, overlapping folds.
Figure 43:
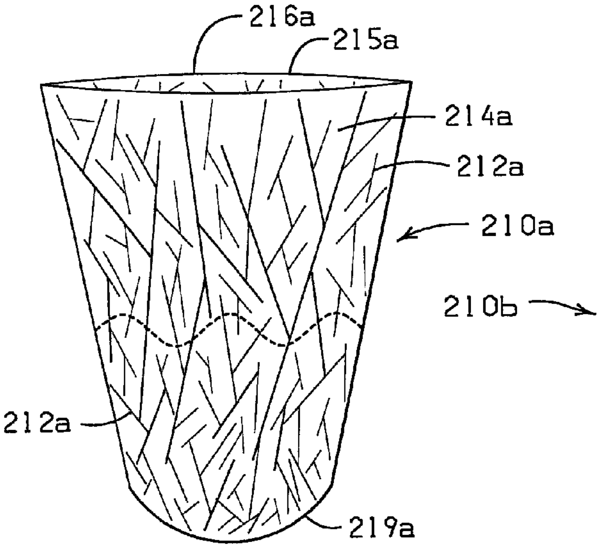
FIG. 43 is a perspective view of a sleeve like the sleeve in FIG. 21, but rather than having pleats, having randomly positioned, overlapping folds.
Figure 44:
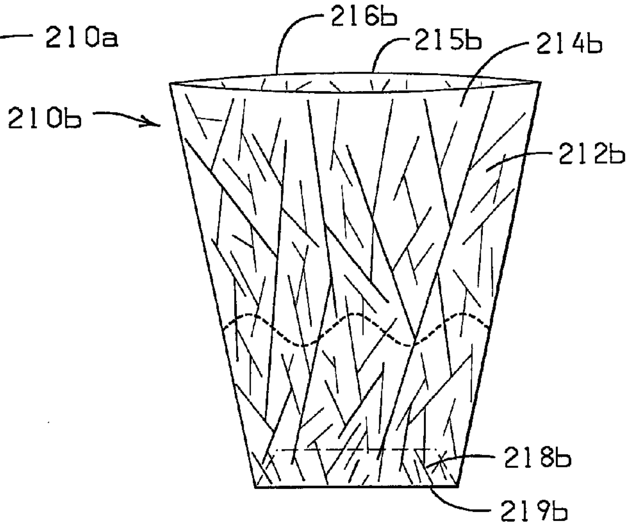
FIG. 44 is a perspective view of a sleeve like the sleeve in FIG. 22, but rather than having pleats, having randomly positioned, overlapping folds.
Figure 45:
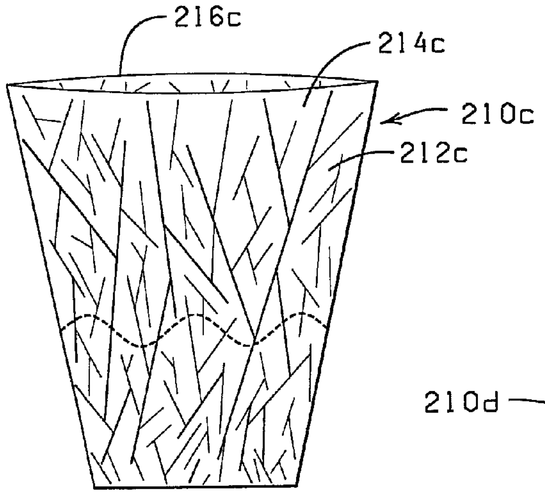
FIG. 45 is a perspective view of a sleeve like the sleeve in FIG. 23, but rather than having pleats, having randomly positioned, overlapping folds.
Figure 46:
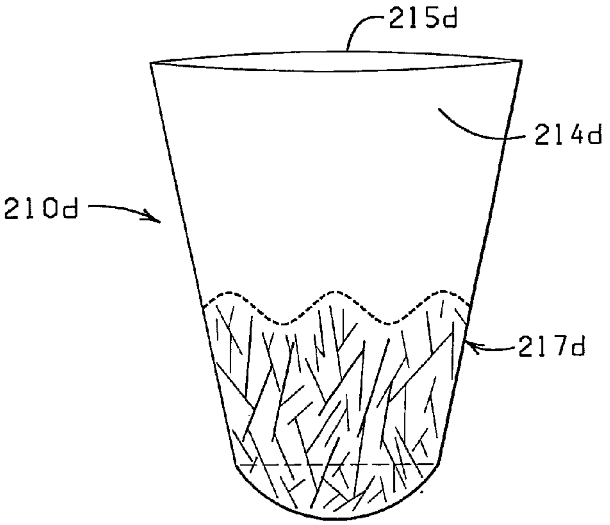
FIG. 46 is a perspective view of a sleeve like the sleeve in FIG. 24, but rather than having pleats, having randomly positioned, overlapping folds.
Figure 47:
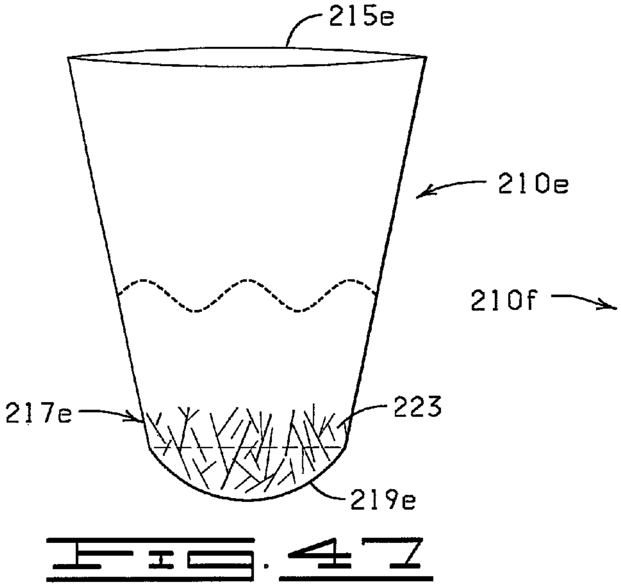
FIG. 47 is a perspective view of a sleeve like the sleeve in FIG. 25, but rather than having pleats, having randomly positioned, overlapping folds.
Figure 48:
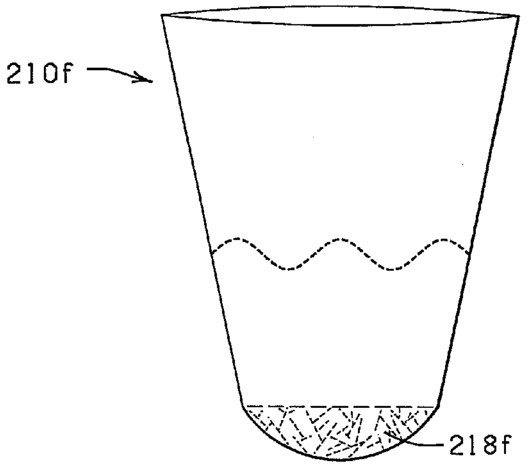
FIG. 48 is a perspective view of a sleeve like the sleeve in FIG. 40, but rather than having an elastomeric portion, having randomly positioned, overlapping folds.

Attention is now drawn to another set of embodiments of the presently disclosed and claimed inventive concept(s), the first of which is designated by the general reference numeral 210 shown in FIG. 42. In this version of the presently disclosed and claimed inventive concept(s), the expansion elements comprise a plurality of overlapping folds 212 which are randomly positioned on a first panel 214 and second panel 216 and on a gusset 218 in a lower portion 217 of the sleeve 210. The overlapping portions of the overlapping folds 212 may be connected via a bonding material or they may be unconnected or some may be connected and some unconnected. The overlapping folds 212 may be distributed over the entire surface of the first and second panels 214 and 216 of the sleeve 210 from an upper end 215 to a lower end 219 as shown in the sleeve 210 in FIG. 42 or overlapping folds 212*d* may be disposed over only a lower portion 217*d* of a sleeve 210*d* with an upper end 215*d* (FIG. 46), for example, or over only an area 223 adjacent a lower end 219*e* of a sleeve 210*e* with an upper end 215*e* and lower portion 217*e* (FIG. 47). FIG. 43 shows a sleeve 210*a* having overlapping folds 212*a*, a first panel 214*a*, a second panel 216*a*, an upper end 215*a* and a lower end 219*a*, and which is similar to sleeve 210, but does not have a gusset portion. The overlapping folds may be positioned only along the first and second panels 214*c* and 216*c*, respectively, of the sleeve, such as sleeve 210*c* (FIG. 45); only upon a gusset portion 218*f* of a sleeve 210*f* (FIG. 48); or upon both the first and second panels 214, 214*b* and 216, 216*b*, respectively, and the gusset portion 218, 218*b*, as in sleeves 210 and 210*b*, respectively (FIGS. 42 and 44).

Sleeves with overlapping folds are shown as having the same lower end configuration as sleeves described above herein, for example, the sleeves of FIGS. 20-23, respectively.

The sleeves having overlapping folds may be constructed in any of the manners and configurations shown elsewhere herein.

For example, each of the sleeves 210-210*f* may further comprise a support extension as mentioned previously which extends away from a portion of the upper end of the sleeve such as for the sleeve 10*e* as shown in FIG. 10. As described earlier, the support extension has one or more apertures disposed therein for allowing the sleeve to be supported on a support assembly which may comprise, for example, a pair of wickets for shipment, storage, assembly of the sleeve, placement of a pot within the sleeve, or other functions known in the art. As noted above, the support extension may have a plurality of perforations or other detaching element for allowing the support extension to be removed from the sleeve after the sleeve has been provided for use as described elsewhere herein. In another version of the presently disclosed and claimed inventive concept(s), and applicable to any of the sleeves described above, or elsewhere herein, a sleeve has a handle for carrying the potted plant package by the sleeve. The sleeve further comprises a detaching element comprising perforations for removing the handle at a later time.

As noted above, the upper portions and lower portions of the sleeves of the presently disclosed and claimed inventive concept(s) may comprise a unitary construction; or, the sleeves may comprise separately formed components which are attached or sealed together by various bonding materials, as shown and described elsewhere herein.

Figure 49:
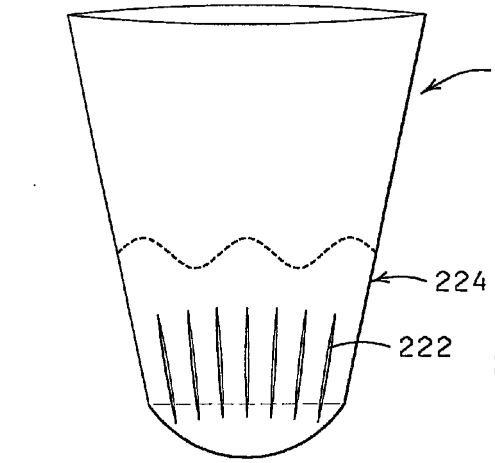
FIG. 49 is a perspective view of a sleeve like the sleeve in FIG. 1 except also having slits in a lower portion thereof.
Figure 50:
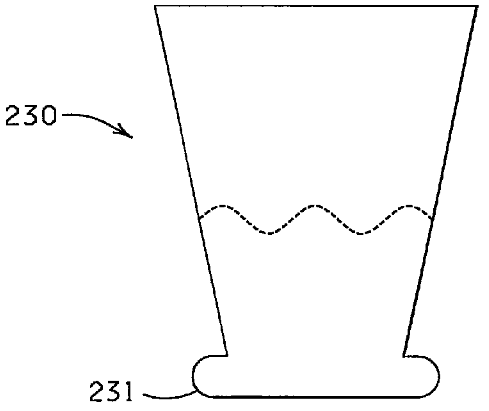
FIG. 50 is an elevational view of a sleeve having a lower end without a gusset and having an alternate shape.
Figure 51:
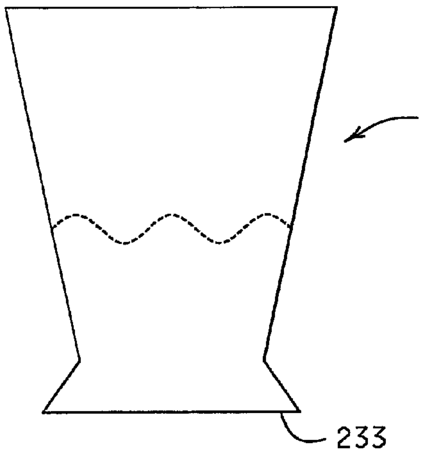
FIG. 51 is an elevational view of a sleeve having a lower end without a gusset and having yet another alternate shape.
Figure 52:
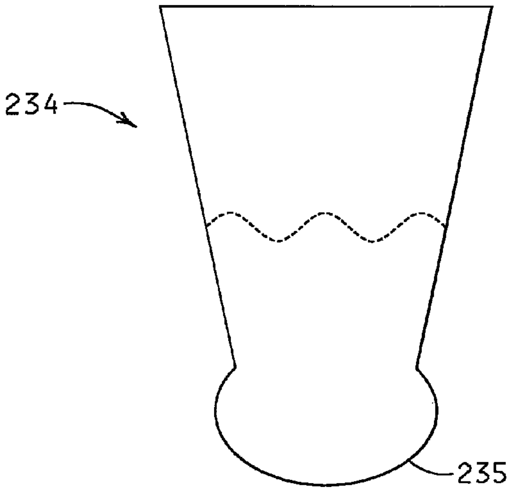
FIG. 52 is an elevational view of a sleeve having a lower end without a gusset and having yet another alternate shape.
Figure 53:
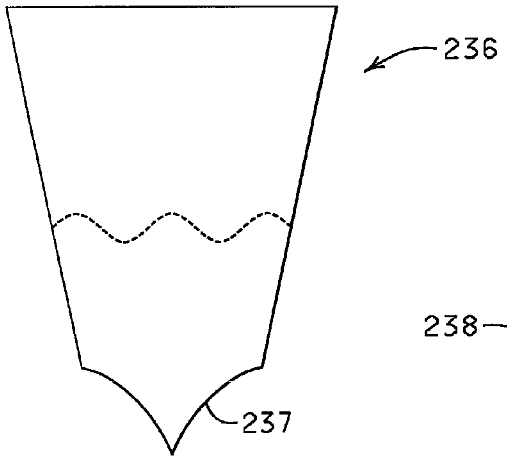
FIG. 53 is an elevational view of a sleeve having a lower end without a gusset and having yet another alternate shape.
Figure 54:
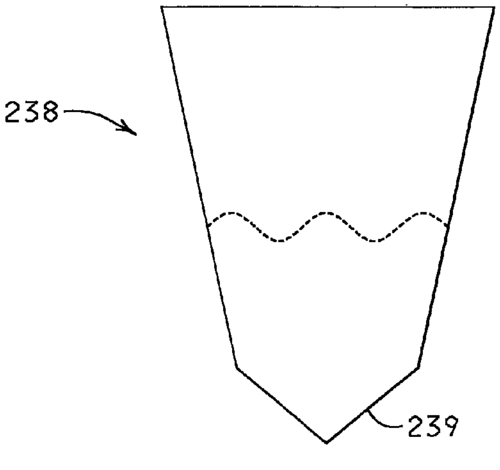
FIG. 54 is an elevational view of a sleeve having a lower end without a gusset and having yet another alternate shape.
Figure 55:
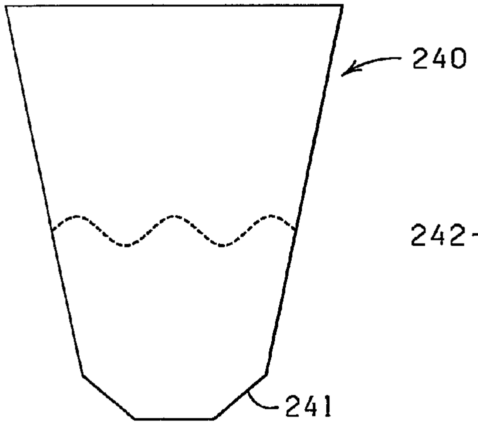
FIG. 55 is an elevational view of a sleeve having a lower end without a gusset and having yet another alternate shape.
Figure 56:
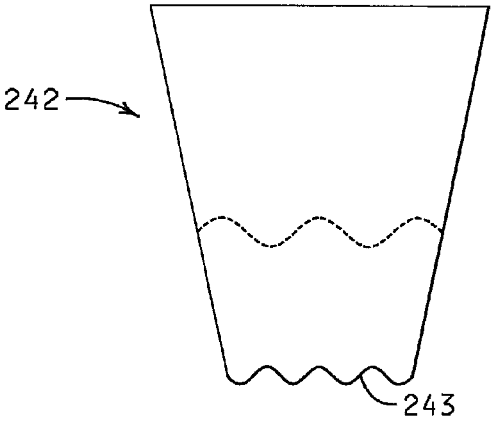
FIG. 56 is an elevational view of a sleeve having a lower end without a gusset and having yet another alternate shape.

In yet another version of the presently disclosed and claimed inventive concept(s), a sleeve designated by the general reference numeral 220 is shown in FIG. 49. Sleeve 220 is exactly the same as sleeve 10 or any of the various versions and embodiments described or shown in figures elsewhere herein except sleeve 220 further comprises a plurality of slits 222 disposed in a lower portion 224 thereof for enabling the lower portion 224 to be more easily expanded to fit snugly about the outer peripheral surface 76 of a pot 70 disposed therein.

Referring now to the embodiments of FIGS. 50-56, shown therein are several alternative shapes of the lower ends of sleeves which may be constructed in accordance with the presently disclosed and claimed inventive concept(s). Shown in FIGS. 50-56 are sleeves designated with the general reference numerals 230, 232, 234, 236, 238, 240 and 242, respectively. Each of sleeves 230-242 has a non-gusseted lower end 231, 233, 235, 237, 239, 241 and 243, respectively, which is sealed closed in a manner similar to either of the sleeves 160*a* or 160*c* shown in FIGS. 21 and 23, respectively, and are ideally suited to any of the sleeves described herein having expansion elements, for example, such as pleats, overlapping folds, slits, and elastomeric portions. The lower ends 231-243 may have a partially rounded shape (lower end 231, FIG. 50), an outwardly-directed partially trapezoidal shape (lower end 233, FIG. 51), an expanded rounded or bulbous shape (lower end 235, FIG. 52), a curved pointed shape (lower end 237, FIG. 53), a triangular shape (lower end 239, FIG. 54), an inwardly-directed trapezoidal shape (lower end 241, FIG. 55), or a curved or wavy shape (lower end 243, FIG. 56).

Figure 57:
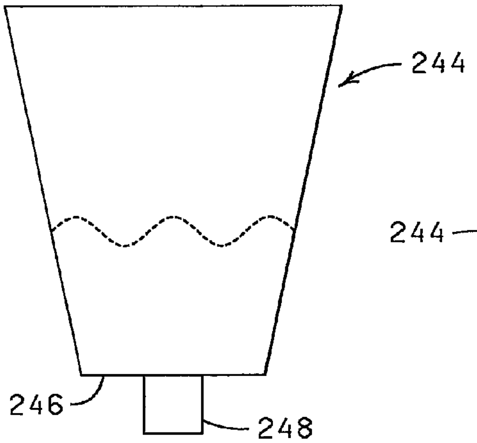
FIG. 57 is an elevational view of a sleeve having an open lower end with a band.
Figure 58:
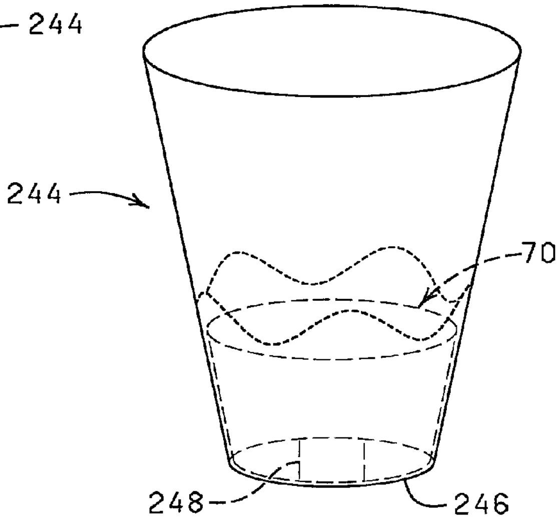
FIG. 58 is a perspective view of the sleeve of FIG. 57 in an open state with a pot disposed therein.

In another version of the presently disclosed and claimed inventive concept(s), shown in FIGS. 57 and 58, is a sleeve designated by the general reference numeral 244, and constructed exactly the same as the sleeves discussed elsewhere herein except that the sleeve 244 has an open lower end 246 and a strap or band 248 which extends across the open lower end 246. The band 248 functions to prevent the sleeve 244 from "riding up" on the pot 70 disposed within the sleeve 244, or to prevent the pot 70 from dropping through the open lower end 246 of the sleeve 244 (FIG. 58).

Figure 59:
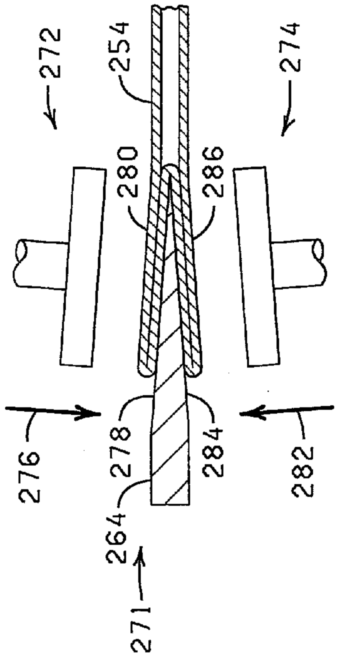
FIG. 59 is a perspective view of an apparatus and process for making a sleeve in accordance with the presently disclosed and claimed inventive concept(s).
Figure 60:
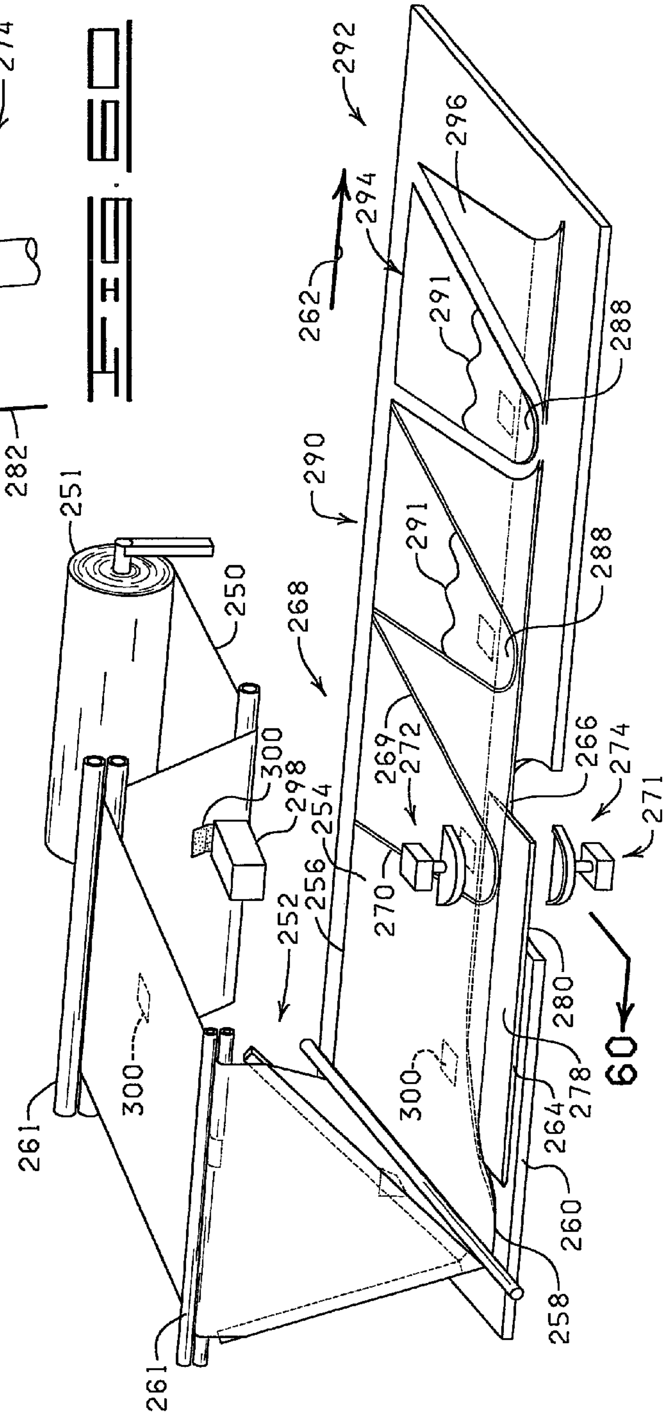
FIG. 60 is a partial cross-sectional view of a gusset sealing mechanism of the apparatus of FIG. 59 taken along line 60-60.

Construction of the Sleeves—FIGS. 59-60

It will be readily appreciated by those of ordinary skill in the art that processes for making standard floral sleeves which have open upper and lower ends are well known. In the preferred embodiment of the presently disclosed and claimed inventive concept(s), the sleeve is constructed with a closed bottom which may simply comprise a seal along the lower end of the sleeve or, more preferably, the closed bottom comprises an infolded portion such as a gusset which when opened enables expansion of the bottom of the sleeve for allowing insertion of a pot therein and a close, conforming fit thereto.

One version of an apparatus and process used to construct a sleeve, such as sleeve 10 described herein, is shown in FIG. 59. A single web of material 250 from a roll 251 is fed by a drive mechanism such as an electric motor (not shown) to a folding assembly 252 which causes the single web of material 250 to fold and double up on itself to form a folded web 254 having an open side 256 and a folded side 258. The folded web 254 is supported upon a conveyor or other support surface 260. As the folded web 254 is advanced by drive rollers 261 or other advancing mechanism in a direction 262, the folded side 258 is caused in a continuous process to be infolded or pouched by an infolding device 264 forming a pouch 266 which extends the length of the folded web 254 therefrom. The folded web 254 with the pouch 266 therein continues to be advanced in the direction 262 to a sealing position 268. A sealing bar (not shown), such as is common and well known in the art, is then activated forming a pair of longitudinally sealed edges 269 and 270. The sealed edges 269 and 270 extend from near the pouch 266 to the open side 256 and may extend completely about the lower end of the incipient sleeve if a gusset is not formed therein.

In the embodiment of the sleeve formed using the apparatus of FIG. 59, not only is the lower end formed with a rounded bottom, but a gusset is also formed. The gusset is formed when portions of the infolded pouch 266 of the folded web 254 are sealed by a sealing device such as the double sealing mechanism 271 shown in FIGS. 59 and 60. The sealing mechanism 271 is comprised of an upper sealing portion 272 and a lower sealing portion 274. The upper sealing portion 272 moves in a direction 276 and presses an infolded portion of the folded web 254 against an upper side 278 of the infolding device 264 and seals a portion 280 of the folded web 254 by heating, pressure or other sealing mechanism well known to those of ordinary skill in the art. Similarly the lower sealing portion 274 moves in a direction 282 and presses an infolded portion of the folded web 254 against a lower side 284 of the infolding device 264 and seals a portion 286 of the folded web 254 as above. In this manner a rounded gusset 288 is formed.

The folded web 254, now having a sleeve outlined by the sealed edges 269 and 270 and with a gusset 288, is further advanced to a perforating position 290 where perforations 291 are punched into the sleeve and optionally support apertures are also punched into the sleeve for enabling a collection of sleeves to be collected in a stack and held on a support mechanism such as a wicket. Ventilation holes may also be punched into the sleeve at this point. In the next step, the sleeve, now with sealed edges 269 and 270, gusset 288, and perforations 291, is advanced to a cutting position 292 where the sleeve is cut by a cutting die or blade (not shown), such as is well known in the art, from the web 254 to form a complete sleeve 294. Excess material 296 may be removed to facilitate removal and storage of the sleeve 294. It will be understood by one of ordinary skill in the art that the steps of sealing, perforating and cutting the sleeves may be performed together in a single step, or two steps at one or two positions.

The process outlined above describes the construction of the sleeve 294 similar to a sleeve 10 without a bonding material disposed upon any portion thereof. However, as explained above, in an alternative version of the presently disclosed and claimed inventive concept(s), a bonding material for bonding a portion of the sleeve to a pot is located on a portion of the inner surface of the sleeve. Shown in FIG. 59 is a bonding material applicator 298 such as a sprayer or pad applicator which can be used to apply an area of bonding material 300 to a portion of the inner surface of a sleeve. The bonding material applicator 298 may be reciprocatingly activated by a reciprocating assembly (not shown) which is preferably automatically controlled and construction of which is well within the level of ordinary skill in the art. The bonding material 300 is preferably applied to the single web of material 250 prior to the doubling over of the single web of material 250 so that when the single web of material 250 is doubled over to form the folded web 254, the bonding material 300 is oriented on a portion of the inner surface of the sleeve 294 preferably in the lower portion of the sleeve 294. The result is the production of a sleeve such as one of those shown in FIGS. 7-9.

The process described herein can be modified to produce sleeves such as any of the other sleeves described elsewhere herein. For example, a sleeve can be produced by inserting a piece of release material (not shown) into the sleeve 294 at some point during the sleeve production process, either manually or automatically, for example, after the bonding material 300 has been applied but before the single web of material 250 has been folded over to form the folded web 254. The piece of release material may be inserted manually by hand or automatically using a device which automatically shoots or blows or deposits such pieces of material and which is well within the skill of one of ordinary skill in the art. Alternatively, the release material may be applied directly upon the bonding material 300 when the bonding material 300 is applied to the single web of material 250. An additional area of bonding material may be applied to another portion of the web with another adhesive applicator (not shown) thereby forming sleeves having the bonding material 300 distributed on different portions of the sleeve.

FIG. 59 shows both edges of open side 256 of the folded web 254 as being an equal distance from the folded side 258. It will be understood by one of ordinary skill in the art that the two edges which comprise the open side 256 of the folded web 254 can be offset during the folding process to form a sleeve such as a sleeve shown in FIG. 8, 10, or 11 having an upper end flap which can be folded over to close the upper end or an upper portion used to form an extension of the sleeve.

FIG. 59 shows a sleeve-forming process in which a single web is doubled over to form the double-layered web. The sleeve formed as described herein may also be formed during a process using two or more separate webs in a manner well-known in the art (not shown). A first roll of material and a second roll of material provide a first web of material and a second web of material, respectively. These webs are fed to a position where one side of the two webs is sealed by a sealing assembly. If a gusset in the finished sleeve is desired, the sealed side can be infolded to form a pouched side as described in the process of FIG. 59. The remainder of the operation can be formed as described above for the process of FIG. 59.

Sleeves formed in accordance with the presently disclosed and claimed inventive concept(s) can also be formed from tubular materials (not shown) such as are commercially available. For example, a sleeve can be formed by cutting a portion of a tube, forming a gusset in the lower end of the tube, or sealing the lower end of the tube to form a closed bottom, then sealing and cutting off portions of the lower end of the tube forming a sleeve having a tapered lower end. Adhesive may be applied to an interior portion of the sleeve by opening the tube and spraying a bonding material onto a portion of the inner surface of the sleeve, for example. In another version of the presently disclosed and claimed inventive concept(s), the process of forming the tubular material from one or more flat webs of material may comprise a step in the process of forming a sleeve.

Changes may be made in the construction and the operation of the various components, elements and assemblies described herein or in the steps or the sequence of steps of the methods described herein without departing from the spirit and scope of the presently disclosed and claimed inventive concept(s) as defined in the following claims.

What is claimed is:

1. A method of covering a potted plant, comprising the steps of:

providing a potted plant comprising a flower pot having a floral grouping disposed therein, the flower pot having an upper end, a bottom and an outer peripheral surface;

providing a floral sleeve having an upper end, a lower end, and a body comprising a sidewall, the sidewall constructed from a material having a plurality of overlapping and connected folds randomly positioned over the entire surface of the sidewall, the floral sleeve initially constructed to have a flattened condition openable to an opened condition;

disposing at least a portion of the potted plant into the floral sleeve; and securing the floral sleeve about at least a portion of the potted plant.

2. The method of claim 1 wherein, in the step of providing the floral sleeve, the floral sleeve has a gusset in the lower end thereof.

3. The method of claim 2, wherein the gusset is further defined as an inwardly folded portion in the lower end thereof, wherein the inwardly folded portion has an inner fold.

4. The method of claim 1 wherein, in the step of providing the floral sleeve, the floral sleeve is further defined as comprising an upper portion and a lower portion, wherein the upper portion is detachable from the lower portion via a detaching element.

5. The method of claim 4, further comprising the step of detaching the upper portion after the floral sleeve has been secured about the potted plant.

6. The method of claim 1 wherein, in the step of providing the floral sleeve, the lower end of the floral sleeve is closed.

7. The method of claim 1 wherein, in the step of providing the floral sleeve, the lower end of the floral sleeve is rounded.

8. The method of claim 1 wherein, in the step of providing the floral sleeve, the lower end of the floral sleeve is curvilinear.

9. The method of claim 1 wherein, in the step of providing the floral sleeve, the lower end of the floral sleeve is convexly curved.

10. The method of claim 1 wherein, in the step of providing the floral sleeve, the lower end of the floral sleeve is triangular.

11. The method of claim 1 wherein, in the step of providing the floral sleeve, the lower end of the floral sleeve is trapezoidal.

12. The method of claim 1 wherein, in the step of providing the floral sleeve, the lower end of the floral sleeve is biconcave.

13. The method of claim 1 wherein, in the step of providing the floral sleeve, the lower end of the floral sleeve has a shape which substantially corresponds to the bottom of the pot.

14. The method of claim 13 wherein, in the step of disposing the potted plant into the floral sleeve, the bottom of the pot rests upon the lower end of the sleeve and the lower end of the sleeve is substantially without an overlapped portion therein.

15. The method of claim 1 wherein, in the step of providing the floral sleeve, the sidewall comprises a first panel and a second panel, and wherein the first and second panels are connected together along first and second sides of the sidewall.

16. The method of claim 1 wherein, in the step of providing the floral sleeve, at least a portion of the sidewall is tapered.

17. The method of claim 1 wherein, in the step of providing the floral sleeve, the floral sleeve is constructed of a material selected from the group consisting of untreated or treated paper, metal foil, polymer film, non-polymer film, woven or nonwoven or synthetic or natural fabric, cardboard, fiber, cloth, burlap, or laminations or combinations thereof.

18. The method of claim 1 wherein, in the step of providing the floral sleeve, at least a portion of the floral sleeve is provided with a decorative pattern or decorative surface ornamentation disposed thereon.

* * * * *

UNITED STATES PATENT AND TRADEMARK OFFICE

CERTIFICATE OF CORRECTION

PATENT NO. : 8,201,360 B2
APPLICATION NO. : 13/329809
DATED : June 19, 2012
INVENTOR(S) : Donald E. Weder et al.

It is certified that error appears in the above-identified patent and that said Letters Patent is hereby corrected as shown below:

Page 3, second column, line 11: Delete "9301709" and replace with -- 8301709 --

Column 15, line 17: Delete "101," and replace with -- 10f --

Column 15, line 20: Delete "101" and replace with -- 10f --

Signed and Sealed this
Seventh Day of August, 2012

David J. Kappos

David J. Kappos
*Director of the United States Patent and Trademark Office*